United States Patent
Bao et al.

(10) Patent No.: US 12,495,085 B2
(45) Date of Patent: Dec. 9, 2025

(54) IMAGE TRANSMISSION METHOD AND APPARATUS

(71) Applicant: HUAWEI TECHNOLOGIES CO., LTD., Guangdong (CN)

(72) Inventors: Pengxin Bao, Chengdu (CN); Xuehuan Wang, Chengdu (CN); Xingxin Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/175,166

(22) Filed: Feb. 27, 2023

(65) Prior Publication Data

US 2023/0224349 A1    Jul. 13, 2023

Related U.S. Application Data

(63) Continuation of application No. PCT/CN2020/112323, filed on Aug. 29, 2020.

(51) Int. Cl.
*H04L 65/70* (2022.01)

(52) U.S. Cl.
CPC .................... *H04L 65/70* (2022.05)

(58) Field of Classification Search
CPC .......................................... H04L 65/70
See application file for complete search history.

(56) References Cited

U.S. PATENT DOCUMENTS

| | | | | |
|---|---|---|---|---|
| 2009/0147120 A1* | 6/2009 | Kurane | ............... | H04N 23/72 348/311 |
| 2011/0285869 A1* | 11/2011 | Yoshida | ............ | H04N 1/32646 348/E7.003 |
| 2012/0057640 A1* | 3/2012 | Shi | ....................... | H04N 19/61 375/240.26 |
| 2013/0155260 A1* | 6/2013 | Kim | ..................... | H04N 7/183 348/464 |
| 2015/0189108 A1* | 7/2015 | Mizuguchi | ...... | H04N 21/23892 348/207.1 |
| 2018/0131845 A1* | 5/2018 | Strein | .............. | H04N 21/4302 |
| 2018/0338125 A1 | 11/2018 | Hyakudai et al. | | |

FOREIGN PATENT DOCUMENTS

| | | |
|---|---|---|
| CN | 101119490 A | 2/2008 |
| CN | 102231728 A | 11/2011 |
| CN | 106973188 A | 7/2017 |
| CN | 107888945 A | 4/2018 |

(Continued)

OTHER PUBLICATIONS

Extended European Search Report in European Appln No. 20950834.0, dated Aug. 25, 2023, 5 pages.

(Continued)

*Primary Examiner* — Azizul Choudhury
(74) *Attorney, Agent, or Firm* — Fish & Richardson P.C.

(57) ABSTRACT

This disclosure discloses image transmission methods and apparatuses. In an implementation, a method performed by an apparatus includes generating a first data packet, wherein the first data packet comprises a portion of content of a frame of an image and first information indicating frame synchronization and line synchronization and sending the first data packet to a second communications apparatus.

23 Claims, 6 Drawing Sheets

(56) References Cited

FOREIGN PATENT DOCUMENTS

| | | |
|---|---|---|
| CN | 108260103 A | 7/2018 |
| CN | 109649437 A | 4/2019 |
| CN | 109996306 A | 7/2019 |
| CN | 110855852 A | 2/2020 |
| JP | H08307824 A | 11/1996 |
| JP | 2008061010 A | 3/2008 |
| JP | 2010056964 A | 3/2010 |
| JP | 2019124832 A | 7/2019 |
| WO | 2020116213 A1 | 6/2020 |

OTHER PUBLICATIONS

Office Action in Japanese Appln. No. 2023-513833, mailed on Feb. 19, 2024, 15 pages (with English translation).
International Search Report and Written Opinion in International Appln. No. PCT/CN2020/112323, mailed on May 21, 2021, 15 pages (with English translation).

\* cited by examiner

IMAGE TRANSMISSION METHOD AND APPARATUS

CROSS-REFERENCE TO RELATED APPLICATIONS

This application is a continuation of International Application No. PCT/CN2020/112323, filed on Aug. 29, 2020, the disclosure of which is hereby incorporated by reference in its entirety.

TECHNICAL FIELD

This application relates to the communications field, and in particular, to an image transmission method and an apparatus.

BACKGROUND

Currently, automobiles are developing intelligently, and corresponding in-vehicle devices are installed on the automobiles to provide intelligent services. For example, an increasing number of advanced driver assistance systems (advanced driver assistance systems, ADASs) or advanced driver systems (advanced driver systems, ADSs) are installed on the automobiles. The in-vehicle devices need to transmit data to each other to work together. For example, most ADASs or ADSs currently rely on a camera to sense an environment around an automobile in real time. Therefore, it becomes particularly important that the camera accurately transmits the sensed driving environment information to an image processing unit of the ADAS or the ADS.

Before sending data to another in-vehicle device, one in-vehicle device needs to encapsulate the data, and then send the encapsulated data. The encapsulated data may be a data packet. The data packet may include a header and a payload. The payload is used to carry the data, and the header is used to carry some description information of the data. Currently, a header of a data packet occupies a relatively large quantity of bits, resulting in reduced encapsulation efficiency.

SUMMARY

Embodiments of this application provide an image transmission method and an apparatus, to improve encapsulation efficiency.

According to a first aspect, a first image transmission method is provided. The method includes: A first communications apparatus generates a first data packet, where the first data packet includes a part of content of a frame of image and first information, and the first information is used to indicate a logical frame number of a frame in which the part of content is located, and a line in which the part of content is located in the frame of image. The first communications apparatus sends the first data packet to a second communications apparatus.

The method may be performed by the first communications apparatus. The first communications apparatus may be a communications device or a communications apparatus that can support a function required by the communications device to implement the method, for example, a chip. For example, the first communications apparatus is a terminal apparatus. The terminal apparatus may be an in-vehicle apparatus such as an in-vehicle camera or a CDC, or may be a non-in-vehicle apparatus. The terminal apparatus is a terminal device, or is a chip that is disposed in the terminal device and that is configured to implement a function of the terminal device, or is another component that is configured to implement a function of the terminal device.

In the embodiments of this application, the first information may indicate the logical frame number of the frame in which the content included in the first data packet is located. Because the first information indicates the logical frame number, and does not need to indicate an actual frame number, the first information does not need to occupy excessive bits. For example, even if the first information occupies only one bit, the first information can indicate the logical frame number. Compared with the conventional technology, the technical solutions provided in the embodiments of this application can reduce a quantity of bits occupied by a header of a data packet, reduce transmission overheads, and improve encapsulation efficiency.

In an optional implementation, the first information includes frame indication information and line number indication information, the frame indication information is carried in a frame indication field, and the line number indication information is carried in a line number indication field. That the first information is used to indicate a logical frame number of a frame in which the part of content is located, and a line in which the part of content is located in the frame of image may be implemented in the following manner:

The frame indication field is used to indicate the frame number of the frame in which the part of content is located, and the line number indication field is used to indicate the line in which the part of content is located in the frame of image.

In this manner, the frame indication field (or the frame indication information) may indicate the frame number of the frame in which the part of content is located, and the line number indication field may indicate the line in which the part of content is located in the frame of image. In other words, different content may be indicated by using different information, to implement clearer indication. In addition, the frame indication information may indicate the frame in which the part of content is located. Therefore, frame indication information included in data packets that include content of a same frame needs to have a same value, and is used to indicate a logical frame number of the frame. In this way, even if some data packets are lost in a transmission process, there is still a data packet that can be normally received. A receive end can extract a frame synchronization signal based on frame indication information included in the received data packet. It can be learned that the solutions provided in the embodiments of this application can improve frame synchronization reliability, and avoid image disorder that is caused because the receive end cannot extract the frame synchronization signal.

In an optional implementation, that the first information is used to indicate a logical frame number of a frame in which the part of content is located, and a line in which the part of content is located in the frame of image may be implemented in the following manner:

The first information is used to indicate, by using a joint coding scheme, the logical frame number of the frame in which the part of content is located, and the line in which the part of content is located in the frame of image.

The joint coding scheme is used, so that one piece of information (that is, the first information) can indicate more content, thereby improving information utilization. In addition, using the joint coding scheme helps reduce a quantity of bits occupied by a field for completing a same function, and can improve encapsulation efficiency to a greater extent.

In addition, states of the first information clearly indicate a start and an end of a frame respectively. Even if a data packet used to indicate an end frame of a previous frame is lost, the receive end can determine a start location of a next frame based on a received data packet used to indicate the start frame of the next frame, and can determine the end location of the previous frame accordingly. Apparently, according to the technical solutions in the embodiments of this application, the receive end can more reliably determine the start and the end of the frame.

In an optional implementation, the first data packet may further include a line segment indication field, the line segment indication field is used to indicate a first quantity, and the first quantity is used to indicate a quantity of data packets in the line in which the part of content is located.

For example, in an in-vehicle scenario, a line of a frame of image is not divided into excessive segments. Therefore, the segments of the line of the frame of image may be indicated without using excessive bits. In the embodiments of this application, the line segment indication field indicates a quantity of segments into which a line is divided, and does not need to indicate a specific segment number. In this way, a quantity of bits occupied by the line segment indication field can be reduced, and encapsulation efficiency can be improved. In other words, the embodiments of this application provide another indication manner (that is, indicate a quantity of segments into which a line is divided), so that a quantity of bits occupied by the line segment indication field can be reduced.

In an optional implementation, a quantity of bits occupied by the line segment indication field is greater than or equal to 2 and less than 8.

The quantity of bits occupied by the line segment indication field may be greater than or equal to 2 and less than 8. Alternatively, the quantity of bits occupied by the line segment indication field is not limited, for example, may be 1, or may be greater than or equal to 8. If an existing header of a data packet is used, the receive end may determine a segment number of a data packet by using a value of an i_seq_num field. The i_seq_num field occupies eight bits. However, in the embodiments of this application, the receive end may determine, by using the line segment indication field, a quantity of segments into which a line is divided, and a quantity of bits occupied by the line segment indication field is less than 8. Apparently, compared with the existing manner, the technical solutions provided in the embodiments of this application can reduce a quantity of bits occupied by a header, thereby improving encapsulation efficiency.

In an optional implementation, the first information is further used to indicate a first quantity, and the first quantity is used to indicate a quantity of data packets in the line in which the part of content is located. That the first information is used to indicate a logical frame number of a frame in which the part of content is located, a line in which the part of content is located in the frame of image, and a first quantity may be implemented in the following manner:

The first information is used to indicate, by using a joint coding scheme, the logical frame number of the frame in which the part of content is located, the line in which the part of content is located in the frame of image, and the first quantity.

The joint coding scheme is used, so that one piece of information (that is, the first information) can indicate more content, thereby improving information utilization. In addition, in a third implementation, the first information can indicate more content, so that a quantity of bits occupied by a field for completing a same function can be reduced to a greater extent, thereby improving encapsulation efficiency to a greater extent. In addition, states of the first information clearly indicate a start and an end of a frame respectively. Even if a data packet used to indicate an end frame of a previous frame is lost, the receive end can determine a start location of a next frame based on a received data packet used to indicate the start frame of the next frame, and can determine the end location of the previous frame accordingly. According to the technical solutions in the embodiments of this application, the receive end can more reliably determine the start and the end of the frame.

In an optional implementation, that the first information is used to indicate a line in which the part of content is located in the frame of image may be implemented in the following manner:

The first information is used to indicate a logical line number of the part of content in the frame of image.

A logical line number is a line count mode, and does not record a real line number, but is used to distinguish between different lines within a specific range. Because the first information indicates the logical line number, and does not need to indicate an actual line number, the first information does not need to occupy excessive bits. Therefore, because the first information indicates the logical line number, and does not need to indicate an actual line number, the technical solutions provided in the embodiments of this application can reduce a quantity of bits occupied by a header, reduce transmission overheads, and improve encapsulation efficiency.

In an optional implementation, the first data packet may further include a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

The first communications apparatus may count all data packets by using the sequence number field, so that sequence numbers of all the data packets sent by the first communications apparatus are consecutive, and the receive end can determine, based on sequence number fields in received data packets, data packets that are lost in a transmission process, and determine locations of the lost data packets based on the sequence number fields, thereby reducing a probability that the data received by the receive end is disordered.

In an optional implementation, the first data packet may further include a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

The stream identifier field may indicate the identifier of the first data stream, and the first data stream is a data stream in which the first data packet is located, so that the second communications apparatus can determine the data stream to which the first data packet belongs. For example, in an in-vehicle scenario, a small quantity of data streams are transmitted. Therefore, the stream identifier field can indicate the data stream without occupying excessive bits. In this way, a quantity of bits occupied by a header can be reduced, and encapsulation efficiency can be improved.

In an optional implementation, the first data packet may further include a data format field, and the data format field is used to indicate a format and a pixel quantization depth of the frame of image.

The second communications apparatus can determine, by using the data format field, the format and the pixel quantization depth of the image in which the content included in the first data packet is located.

According to a second aspect, a second image transmission method is provided. The method includes: A second communications apparatus receives a first data packet from a first communications apparatus. The second communications apparatus obtains a part of content of a frame of image and first information from the first data packet, and determines, based on the first information, a logical frame number of a frame in which the part of content is located, and a line in which the part of content is located in the frame of image.

The method may be performed by the second communications apparatus. The second communications apparatus may be a communications device or a communications apparatus that can support a function required by the communications device to implement the method, for example, a chip. For example, the second communications apparatus is a terminal apparatus. The terminal apparatus may be an in-vehicle apparatus such as an MDC or an in-vehicle display, or may be a non-in-vehicle apparatus. The terminal apparatus is a terminal device, or is a chip that is disposed in the terminal device and that is configured to implement a function of the terminal device, or is another component that is configured to implement a function of the terminal device.

In an optional implementation, the first information includes frame indication information and line number indication information, the frame indication information is carried in a frame indication field, and the line number indication information is carried in a line number indication field. That the second communications apparatus determines, based on the first information included in the first data packet, a logical frame number of a frame in which the part of content is located, and a line in which the part of content is located in the frame of image may be implemented in the following manner:

The second communications apparatus determines, based on the frame indication field, the logical frame number of the frame in which the part of content is located, and determines, based on the line number indication field, the line in which the part of content is located in the frame of image.

In an optional implementation, that the second communications apparatus determines, based on the first information included in the first data packet, a logical frame number of a frame in which the part of content is located, and a line in which the part of content is located in the frame of image may be implemented in the following manner:

The second communications apparatus determines, based on a joint coding scheme in the first information, the logical frame number of the frame in which the part of content is located, and the line in which the part of content is located in the frame of image.

In an optional implementation, the first data packet further includes a line segment indication field, the line segment indication field is used to indicate a first quantity, and the first quantity is used to indicate a quantity of data packets in the line in which the part of content is located.

In an optional implementation, a quantity of bits occupied by the line segment indication field is greater than or equal to 2 and less than 8.

In an optional implementation, the first information is further used to indicate a first quantity, and the first quantity is used to indicate a quantity of data packets in the line in which the part of content is located. In an optional implementation, that the second communications apparatus determines, based on the first information included in the first data packet, a logical frame number of a frame in which the part of content is located, a line in which the part of content is located in the frame of image, and a first quantity may be implemented in the following manner:

The second communications apparatus determines, based on a joint coding scheme in the first information, the logical frame number of the frame in which the part of content is located, the line in which the part of content is located in the frame of image, and the first quantity.

In an optional implementation, that the second communications apparatus determines, based on the first information, a line in which the part of content is located in the frame of image may be implemented in the following manner: The second communications apparatus determines, based on the first information, a logical line number of the part of content in the frame of image.

In an optional implementation, the first data packet may further include a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

In an optional implementation, the first data packet further includes a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

In an optional implementation, the first data packet further includes a data format field, and the data format field is used to indicate a format and a pixel quantization depth of the frame of image.

For technical effects brought by the second aspect or the optional implementations, refer to the descriptions of the technical effects brought by the first aspect or the corresponding implementations.

According to a third aspect, a communications apparatus is provided. For example, the communications apparatus is the first communications apparatus described above. The first communications apparatus is configured to perform the method in the first aspect or any optional implementation. Specifically, the first communications apparatus may include modules configured to perform the method in the first aspect or any optional implementation, for example, a processing module and a transceiver module. For example, the transceiver module may include a sending module and a receiving module. The sending module and the receiving module may be different function modules, or may be a same function module but can implement different functions (the sending module is configured to implement a function of sending a signal, and the receiving module is configured to implement a function of receiving a signal). For example, the first communications apparatus is a communications device, or is a chip or another component disposed in the communications device. For example, the communications device is a terminal device or an in-vehicle module. For example, the first communications apparatus may be an in-vehicle module, or may be a chip or another component disposed in the in-vehicle module. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different function modules, or may be a same function module but can implement different functions (the transmitter is configured to implement a function of sending a signal, and the receiver is configured to implement a function of receiving a signal). If the first communications apparatus is a communications device, the transceiver is implemented by an antenna, a feeder, a codec, or the like in the communications device. Alternatively, if the first communications apparatus is a chip disposed in the communications device, the transceiver (or the transmitter and the receiver) is a communications interface (or an interface circuit) or the like in the chip. The communications interface is connected to a radio frequency transceiver component in the communications device, to implement information receiving and sending by using the radio frequency transceiver component. The processing module and the transceiver module are still used as examples to describe the third aspect.

The processing module is configured to generate a first data packet, where the first data packet includes a part of content of a frame of image and first information, and the first information is used to indicate a logical frame number of a frame in which the part of content is located, and a line in which the part of content is located in the frame of image.

The transceiver module is configured to send the first data packet to a second communications apparatus.

In an optional implementation, the first information includes frame indication information and line number indication information, the frame indication information is carried in a frame indication field, and the line number indication information is carried in a line number indication field. That the first information is used to indicate a logical frame number of a frame in which the part of content is located, and a line in which the part of content is located in the frame of image may be implemented in the following manner:

The frame indication field is used to indicate the logical frame number of the frame in which the part of content is located, and the line number indication field is used to indicate the line in which the part of content is located in the frame of image.

In an optional implementation, that the first information is used to indicate a logical frame number of a frame in which the part of content is located, and a line in which the part of content is located in the frame of image may be implemented in the following manner:

The first information is used to indicate, by using a joint coding scheme, the logical frame number of the frame in which the part of content is located, and the line in which the part of content is located in the frame of image.

In an optional implementation, the first data packet may further include a line segment indication field, the line segment indication field is used to indicate a first quantity, and the first quantity is used to indicate a quantity of data packets in the line in which the part of content is located.

In an optional implementation, a quantity of bits occupied by the line segment indication field is greater than or equal to 2 and less than 8.

In an optional implementation, the first information is further used to indicate a first quantity, and the first quantity is used to indicate a quantity of data packets in the line in which the part of content is located. That the first information is used to indicate a logical frame number of a frame in which the part of content is located, a line in which the part of content is located in the frame of image, and a first quantity may be implemented in the following manner:

The first information is used to indicate, by using a joint coding scheme, the logical frame number of the frame in which the part of content is located, the line in which the part of content is located in the frame of image, and the first quantity.

In an optional implementation, that the first information is used to indicate a line in which the part of content is located in the frame of image may be implemented in the following manner:

The first information is used to indicate a logical line number of the part of content in the frame of image.

In an optional implementation, the first data packet may further include a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

In an optional implementation, the first data packet may further include a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

In an optional implementation, the first data packet may further include a data format field, and the data format field is used to indicate a format and a pixel quantization depth of the frame of image.

For technical effects brought by the third aspect or the optional implementations, refer to the descriptions of the technical effects brought by the first aspect or the corresponding implementations.

According to a fourth aspect, a communications apparatus is provided. For example, the communications apparatus is the second communications apparatus described above. The second communications apparatus is configured to perform the method in the second aspect or any optional implementation. Specifically, the second communications apparatus may include modules configured to perform the method in the second aspect or any optional implementation, for example, a processing module and a transceiver module. For example, the transceiver module may include a sending module and a receiving module. The sending module and the receiving module may be different function modules, or may be a same function module but can implement different functions (the sending module is configured to implement a function of sending a signal, and the receiving module is configured to implement a function of receiving a signal). For example, the second communications apparatus is a communications device, or is a chip or another component disposed in the communications device. For example, the communications device is a network device (for example, an access network device), a terminal device, or an in-vehicle module. For example, the second communications apparatus may be an in-vehicle module, or may be a chip or another component disposed in the in-vehicle module. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different function modules, or may be a same function module but can implement different functions (the transmitter is configured to implement a function of sending a signal, and the receiver is configured to implement a function of receiving a signal). If the second communications apparatus is a communications device, the transceiver is implemented by an antenna, a feeder, a codec, or the like in the communications device. Alternatively, if the second communications apparatus is a chip disposed in the communications device, the transceiver (or the transmitter and the receiver) is a communications interface (or an interface circuit) or the like in the chip. The communications interface is connected to a radio frequency transceiver component in the communications device, to implement information receiving and sending by using the radio frequency transceiver component. The processing module and the transceiver module are still used as examples to describe the fourth aspect.

The transceiver module is configured to receive a first data packet from a first communications apparatus.

The processing module is configured to: obtain a part of content of a frame of image and first information from the first data packet, and determine, based on the first information, a logical frame number of a frame in which the part of content is located, and a line in which the part of content is located in the frame of image.

In an optional implementation, the first information includes frame indication information and line number indication information, the frame indication information is carried in a frame indication field, and the line number indication information is carried in a line number indication field. The processing module is configured to:

determine, based on the frame indication field, the logical frame number of the frame in which the part of content is located, and determine, based on the line number indication field, the line in which the part of content is located in the frame of image.

In an optional implementation, the processing module is configured to:

determine, based on a joint coding scheme in the first information, the logical frame number of the frame in which the part of content is located, and the line in which the part of content is located in the frame of image.

In an optional implementation, the first data packet further includes a line segment indication field, the line segment indication field is used to indicate a first quantity, and the first quantity is used to indicate a quantity of data packets in the line in which the part of content is located.

In an optional implementation, a quantity of bits occupied by the line segment indication field is greater than or equal to 2 and less than 8.

In an optional implementation, the first information is further used to indicate a first quantity, and the first quantity is used to indicate a quantity of data packets in the line in which the part of content is located. The processing module is configured to:

determine, based on a joint coding scheme in the first information, the logical frame number of the frame in which the part of content is located, the line in which the part of content is located in the frame of image, and the first quantity.

In an optional implementation, the processing module is configured to:

determine, based on the first information, a logical line number of the part of content in the frame of image.

In an optional implementation, the first data packet may further include a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

In an optional implementation, the first data packet may further include a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

In an optional implementation, the first data packet may further include a data format field, and the data format field is used to indicate a format and a pixel quantization depth of the frame of image.

For technical effects brought by the fourth aspect or the optional implementations, refer to the descriptions of the technical effects brought by the second aspect or the corresponding implementations.

According to a fifth aspect, a communications apparatus is provided. For example, the communications apparatus is the first communications apparatus or the second communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, to implement the method described in the first aspect or the optional implementations or the method described in the second aspect or the optional implementations. Alternatively, the communications apparatus may not include a memory, and the memory may be located outside the communications apparatus. The processor, the memory, and the communications interface are coupled to each other, to implement the method described in the first aspect or the optional implementations or the method described in the second aspect or the optional implementations. For example, when the processor executes the computer instruction stored in the memory, the communications apparatus is enabled to perform the method in the first aspect or any optional implementation or the method in the second aspect or any optional implementation. For example, the communications apparatus is a communications device, or is a chip or another component disposed in the communications device. For example, the communications device is a terminal device or an in-vehicle module. For example, the communications apparatus may be an in-vehicle module, or may be a chip or another component disposed in the in-vehicle module.

If the communications apparatus is a communications device, the communications interface is implemented by a transceiver (or a transmitter and a receiver) or the like in the communications device. For example, the transceiver is implemented by an antenna, a feeder, or a codec in the communications device. Alternatively, if the communications apparatus is a chip disposed in the communications device, the communications interface is an input/output interface or the like in the chip, for example, an input/output pin. The communications interface is connected to a radio frequency transceiver component in the communications device, to implement information receiving and sending by using the radio frequency transceiver component.

In an optional implementation, a part of content of a frame of image may be included in a payload of a first data packet.

In an optional implementation, one or more of first information, a segment indication field, a sequence number field, a stream identifier field, a data format field, and the like may be included in a header of the first data packet.

According to a sixth aspect, a chip is provided. The chip includes a processor and a communications interface, the processor is configured to invoke and run instructions from the communications interface, and when the processor executes the instructions, the chip is enabled to perform the method in the first aspect or the implementations of the first aspect or the method in the second aspect or the implementations of the second aspect.

According to a seventh aspect, a computer-readable storage medium is provided. The computer-readable storage medium is configured to store computer instructions, and when the computer instructions are run on a computer, the computer is enabled to perform the method in the first aspect or the implementations of the first aspect or the method in the second aspect or the implementations of the second aspect.

According to an eighth aspect, a computer program product is provided. The computer program product includes computer instructions, and when the computer instructions are run on a computer, the computer is enabled to perform the method in the first aspect or the implementations of the first aspect or the method in the second aspect or the implementations of the second aspect.

According to a ninth aspect, an embodiment of this application provides a communications system. The communications system includes the communications apparatus in the third aspect, the communications apparatus in the fifth aspect (which is configured to implement the method described in the first aspect or the optional implementations), or the chip in the sixth aspect (which is configured to implement the method described in the first aspect or the optional implementations), and includes the communications apparatus in the fourth aspect, the communications apparatus in the fifth aspect (which is configured to implement the method described in the second aspect or the optional implementations), or the chip in the sixth aspect (which is configured to implement the method described in the second aspect or the optional implementations).

In the embodiments of this application, the first information may indicate the logical frame number of the frame in which the content included in the first data packet is located. Therefore, the first information does not need to include excessive bits, thereby reducing a quantity of bits occupied by a header, reducing transmission overheads, and improving encapsulation efficiency.

DESCRIPTION OF EMBODIMENTS

Figure 1:
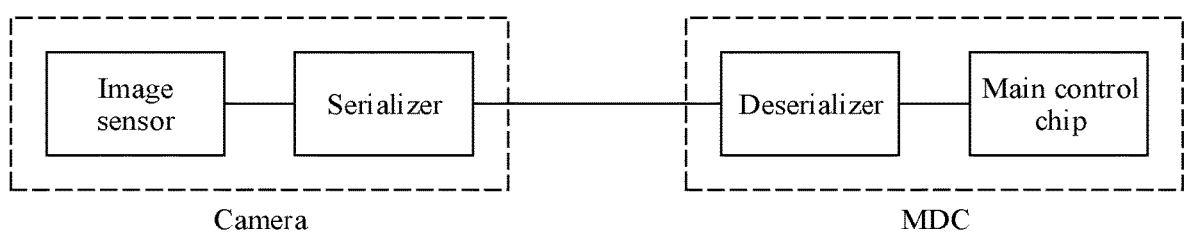
FIG. 1 is a schematic diagram of an application scenario according to an embodiment of this application.

In the specification, claims, and accompanying drawings of the embodiments of this application, the terms "include", "contain", and any other variants thereof mean to cover the non-exclusive inclusion. For example, a process, method, system, product, or device that includes a list of steps or units is not necessarily limited to the expressly listed steps or units, but may include other steps or units that are not expressly listed or are inherent to such a process, method, product, or device.

For example, a communications apparatus in the embodiments of this application may be a device that can send an image or a video file to another device, for example, an in-vehicle device such as an in-vehicle camera or a cockpit domain controller (cockpit domain controller or control domain cockpit, CDC), or may be an electronic device such as a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a virtual reality device. For another example, the communications apparatus in the embodiments of this application may alternatively be an intelligent terminal other than a vehicle that has a function that can be implemented by a first communications apparatus or a second communications apparatus in the embodiments of this application, or may be disposed in the intelligent terminal other than the vehicle that has the function that can be implemented by the first communications apparatus or the second communications apparatus in the embodiments of this application, or may be disposed in a component of the intelligent terminal. The intelligent terminal may be another terminal device such as an intelligent transportation device, a smart home device, or a robot. The communications apparatus includes but is not limited to an intelligent terminal, and another sensor such as a controller, a chip, a radar, or a camera, another component, and the like in the intelligent terminal. Alternatively, the communications apparatus in the embodiments of this application may be a function module disposed in any one of the foregoing devices, for example, a chip system.

The following first describes some terms in the embodiments of this application, to help a person skilled in the art have a better understanding.

(1) A cockpit domain controller (CDC) is also referred to as a head unit. In addition to conventional functions such as radio, music time-frequency play, and navigation, the current in-vehicle machine further has a cellular communication function (3G, 4G, or the like), and can combine a controller area network (controller area network, CAN) technology with a bus (BUS) technology of a vehicle, to implement vehicle-to-pedestrian and vehicle-to-everything information communication, and enhance user experience and service and safety-related functions.

(2) A multi domain controller (multi domain controller, MDC), also referred to as a mobile data center (mobile data center, MDC), is a control center of an ADAS or an ADS. The MDC may receive information sensed by a sensor such as a camera, a laser radar, or a millimeter-wave radar, process the received information, and correspondingly perform determining, to control travel of a vehicle.

(3) In the embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" usually represents an "or" relationship between the associated objects. "At least one of the following" or a similar expression thereof indicates "any combination of the following", including "one or any combination of the following". For example, at least one of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit a size, content, an order, a time sequence, a priority, or importance of the plurality of objects. For example, a first data packet and a second data packet are only names given for ease of description, and the two data packets may be a same data packet, or may be different data packets.

The foregoing describes some noun concepts in the embodiments of this application. The following describes technical features in the embodiments of this application.

Currently, automobiles are developing intelligently, and corresponding in-vehicle devices are installed on the automobiles to provide intelligent services. For example, ADASs or ADSs are increasingly installed on the automobiles. The in-vehicle devices need to transmit data to each other to work together. For example, most ADASs or ADSs currently rely on a camera to sense an environment around a vehicle in real time. Therefore, it becomes particularly important that the camera accurately transmits the sensed driving environment information to an image processing unit of the ADAS or the ADS. The ADAS or ADS has increasingly high requirements on a resolution, a frame rate, and a pixel quantization depth of an image. Therefore, an amount of data that needs to be transmitted is also larger, and a rate requirement on a transmission chip is also higher.

FIG. 1 shows an example of an in-vehicle image transmission process. FIG. 1 includes a camera and an MDC. An image sensor in the camera transmits sensed image data to a serializer in the camera. The serializer encapsulates the received image data into a data packet according to a specific format, and then sends the data packet to a deserializer in the MDC. The deserializer parses the data packet to obtain the image data included in the data packet, and sends the image data to a main control chip in the MDC.

A video includes images at a specific frame rate. Each frame of image includes fixed lines and columns. A quantity of pixels of an image is obtained by multiplying a quantity of lines and a quantity of columns. For example, an image with a resolution of 1080P includes 1080 lines and 1920 columns, and a quantity of pixels of the image is 1080×1920. Each pixel is carried by using a specific quantity of bits (bit). For example, one pixel may be carried by using 16 bits, or may be carried by using another quantity of bits.

During image transmission, in addition to pixel data of an image, two synchronization signals are further transmitted: a frame synchronization signal and a line synchronization signal. The frame synchronization signal is used to identify a start and an end of a frame, and the line synchronization signal is used to identify a start and an end of each line in a frame.

Figure 2:
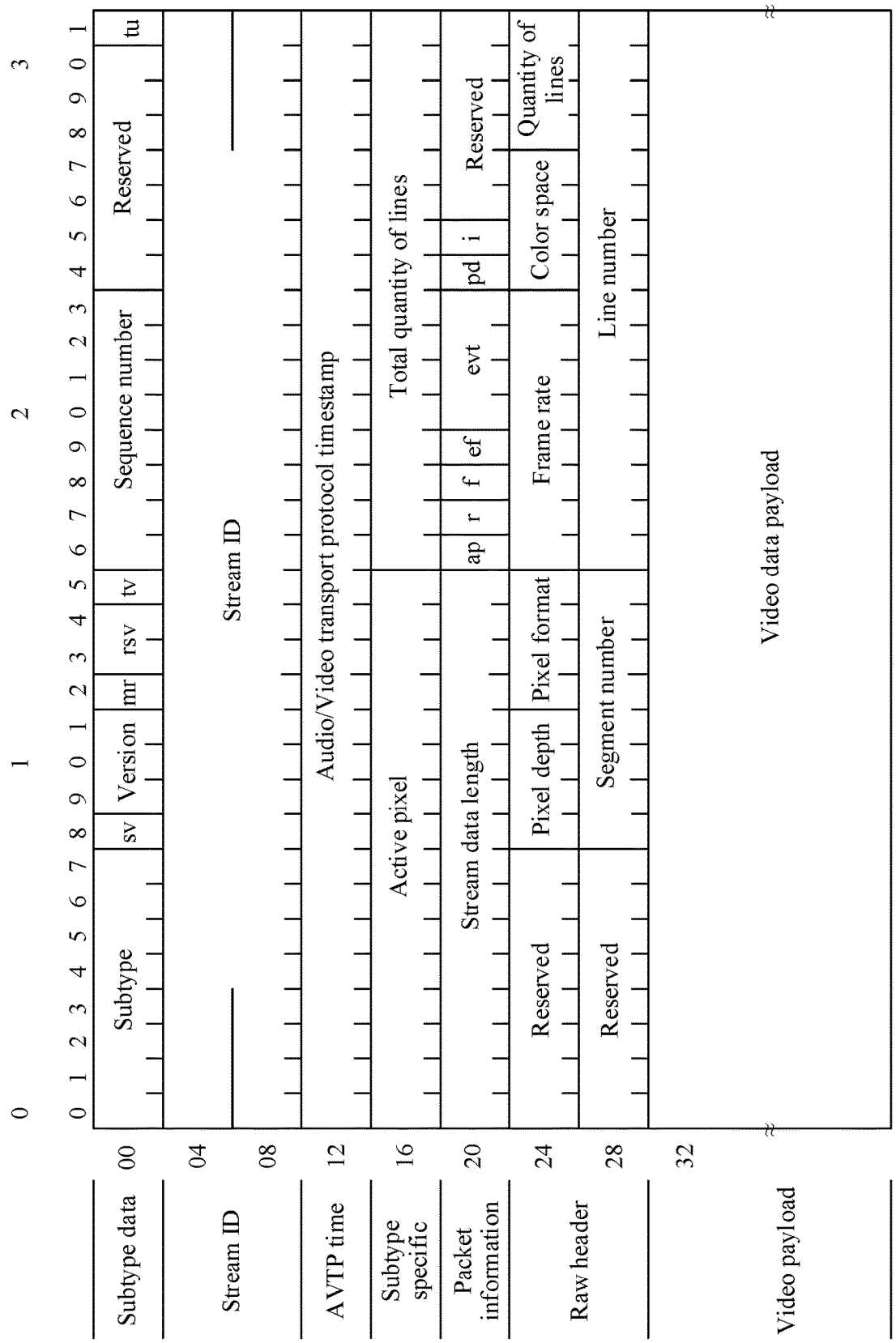
FIG. 2 is a schematic diagram of an encapsulation format of a data packet.

FIG. 2 shows a header and a payload of a data packet. One scale in FIG. 2 represents one bit (bit), and eight bits form one byte (byte).

A subtype (subtype) field is used to indicate a data type, for example, an RAW image, and occupies one byte.

An sv field, that is, a stream identity valid (stream_id valid) field, is used to indicate whether a stream ID is valid, and occupies one bit.

A version (version) field is used to indicate a protocol version number, and occupies four bits.

An mr field, that is, a media clock restart (media clock restart) field, is used to indicate whether a clock source is switched, and occupies one bit.

An rsv field, that is, a reserved (reserved) field, is used as a reserved bit, and occupies two bits.

A tv field, that is, a timestamp valid (timestamp valid) field, is used to indicate whether a timestamp is valid, and occupies one bit.

A sequence number (sequence_num) field is used to indicate a sequence number of the data packet, and occupies one byte.

The header shown in FIG. 2 includes a plurality of reserved bit fields, which are used to indicate reserved locations in the header, and are not used.

A tu field, that is, a timestamp uncertain (timestamp uncertain) field, is used to indicate whether a timestamp is accurate, and occupies one bit.

The subtype field, the sv field, the version field, the mr field, the rsv field, the tv field, the sequence_num field, a reserved field that occupies seven bits, and the tu field belong to subtype data.

A stream ID (stream_id) field is used to indicate an ID of a data stream to which the data packet belongs, and occupies eight bytes.

An avtp_timestamp field is used to indicate a timestamp of the current data packet, and occupies four bytes. The avtp_timestamp field belongs to an audio/video transport protocol (audio/video transport protocol, AVTP) time (time), and "timestamp" indicates a timestamp.

An active pixel (active_pixels) field is used to indicate a quantity of active pixels included in a line in which the data packet is located in a frame of image, and occupies two bytes.

A total line quantity (total_line) field is used to indicate a quantity of lines included in a frame of image in which the data packet is located, and occupies two bytes.

The active_pixels field and the total_line field are subtype specific (subtype specific).

A stream data length (stream_data_length (octets)) field is used to indicate a length of the payload of the packet, and the length is in a unit of byte. Herein, "octets" means an 8-bit group, that is, eight bits: one byte. The stream data length field occupies two bytes.

An ap field, that is, an active pixel (active pixel) field, is used to indicate whether the data packet includes an active pixel, and occupies one bit.

An r field is used to indicate a reserved field, and occupies one bit.

An f field, that is, a field (field) field, is used to indicate a first field and a second field in an interlaced pair in an interlaced video payload, and occupies one bit.

An ef field, that is, an end frame (end frame) field, is used to indicate an end of a frame, and occupies one bit. If the current data packet is the last data packet in a frame of image, the ef field is set to 1, or otherwise, the ef field is set to 0.

An evt field, that is, an event (event) field, is reserved for an indication event of an upper-layer protocol, and occupies four bits.

A pd field, that is, a pull-down (pull-down) field, is used to indicate whether a video frame rate decreases, and occupies one bit.

An i field, that is, an interlaced (interlaced) field, is used to indicate whether a video source is in an interlaced video mode, and occupies one bit.

The stream_data_length (octets) field, the ap field, the r field, the f field, the ef field, the evt field, the pd field, the i field, and a reserved field that occupies six bits belong to packet information (packet information).

A pixel depth (pixel_depth) field is used to indicate a pixel quantization depth of a frame of image in which the data packet is located, and occupies four bits.

A pixel format (pixel_format) field is used to indicate a type of a frame of image in which the data packet is located, for example, to indicate that the type of the image is red, green, and blue (RGB), and occupies four bits.

For example, it may be determined, with reference to the pixel_depth field and the pixel format field, that the frame of image in which the data packet is located is an RGB888 image.

A frame rate (frame_rate) field is used to indicate a frame rate of a frame of image in which the data packet is located, and occupies one byte.

A color space (colorspace) field is used to indicate a color space of an image in which content included in the data packet is located, that is, to indicate a color composition of the image during display, and occupies four bits.

A line quantity (num_lines) field is used to indicate a quantity of lines included in the current data packet, and occupies 4 bits. When the quantity of lines included in the data packet is less than 1 (for example, the data packet includes only some pixels of one line), the field is set to 0.

A reserved field that occupies one byte, the pixel_depth field, the pixel_format field, the frame_rate field, the colorspace field, the num_lines field, a reserved field that occupies one byte, the i_seq_num field, and the line_number field belong to a raw header (raw header).

A segment number (i_seq_num) field is used to indicate a segment number corresponding to content included in the current data packet in a line of a frame of image, and occupies one byte. To be specific, a line of pixels of a frame of image may be divided into a plurality of segments, and one segment is carried in one data packet. In this case, each of the plurality of segments corresponds to one segment number, and the i_seq_num field is used to indicate a segment number of a pixel carried in the current data packet. When a value of the num_lines field is 0, it indicates that one line of pixels are divided into a plurality of data packets for transmission, and the i_seq_num field is used to indicate a segment number of the current data packet in the line of pixels. When the value of the num_lines field is greater than 0, a value of the i_seq_num field is set to 0.

A line number (line_number) field is used to indicate a line in which a pixel included in the current data packet is located, and occupies two bytes. When the data packet includes a plurality of lines of a frame of image, the line_number field is used to indicate a maximum line number in the plurality of lines. When a value of the line_number field is equal to a value of the total line field, it indicates that a current frame ends.

In addition, a video data payload (video_data_payload) field is used to carry image data.

It can be learned from the foregoing descriptions that a receive end may extract a frame synchronization signal by using the value of the of field and by determining whether the value of the line_number field is equal to the value of the total_line field. In addition, the receive end may extract a line synchronization signal by using the value of the line_number field. In addition, when packet loss occurs, the receive end may determine, by using the line_number field, a line of a frame of image in which a pixel included in a lost data packet is located, and may further determine, by using the i_seq_num field, a location of the pixel included in the lost data packet in the line of the frame of image. Therefore, disorder is not caused in the frame of image at the receive end after the packet loss occurs.

In some special scenarios, the header of the data packet that is shown in FIG. 2 actually includes some redundant fields, resulting in reduced encapsulation efficiency. The following uses an in-vehicle scenario as an example for description.

For example, in the in-vehicle scenario, all used cameras are high-definition cameras. Therefore, a line of a frame of image includes a relatively large quantity of pixels, and a data amount is relatively large. In actual application, a plurality of lines are generally not encapsulated in one data packet, but only one line is encapsulated in one data packet at most. Therefore, the num_lines field is actually an invalid field in the in-vehicle scenario, resulting in reduced encapsulation efficiency.

For another example, if the header of the data packet that is shown in FIG. 2 is used, a frame synchronization signal and a line synchronization signal may be extracted by using the total_line field and the line_number field. The two fields occupy a relatively large quantity of bits, resulting in excessively high overheads and reduced encapsulation efficiency.

For another example, if the header of the data packet that is shown in FIG. 2 is used, a frame synchronization signal may be extracted by using the of field or by using the total_line field and the line_number field. Apparently, functions are duplicated.

For another example, in the in-vehicle scenario, during image transmission, if a line of a frame of image needs to be segmented, a quantity of obtained segments is not very large, for example, a maximum of a dozen segments. Therefore, segment numbers in the line can be indicated without using excessive bits. However, the i_seq_num field occupies a relatively large quantity of bits, resulting in relatively high overheads and reduced encapsulation efficiency.

For another example, in the in-vehicle scenario, pixels carried in a data packet are generally active pixels. Therefore, the active-pixel field does not need to be used to indicate active pixels.

For another example, in the in-vehicle scenario, a frame rate of an image is generally fixed, and preconfigured by both a transmit end and a receive end. Therefore, the frame-rate field does not need to be used to indicate the frame rate of the image.

For another example, in the in-vehicle scenario, a camera generally outputs video data directly collected by an image sensor, and there is no color space. If a CDC outputs video data, a transmit end and a receive end generally preconfigure a color space. Therefore, the colorspace field does not need to be set in the data packet.

In conclusion, in some special scenarios, the header shown in FIG. 2 includes some redundant fields or redundant bits, resulting in relatively high encapsulation overheads. In addition, the data packet includes the header and the payload, and encapsulation efficiency is equal to a quantity of bytes occupied by the payload in the data packet divided by a total quantity of bytes of the data packet. It can be learned that a larger quantity of bits occupied by the header indicates a larger total quantity of bytes of the data packet and lower encapsulation efficiency.

In view of this, the technical solutions in the embodiments of this application are provided. In the embodiments of this application, first information may indicate a logical frame number of a frame in which content included in a first data packet is located. Because the first information indicates the logical frame number, and does not need to indicate an actual frame number, the first information does not need to include excessive bits. For example, even if the first information includes only one bit, the first information can indicate the logical frame number. Compared with the conventional technology, the technical solutions provided in the embodiments of this application can reduce a quantity of bits occupied by a header, reduce transmission overheads, and improve encapsulation efficiency.

A communication scenario to which the technical solutions provided in the embodiments of this application are applied may include wide area communication, for example, communication between a plurality of base stations and a plurality of terminal devices, or may include an intra-vehicle communication scenario, for example, communication between a CDC and a display or communication between a camera and an MDC, or may include a vehicle-to-everything communication scenario. For example, the embodiments of this application may be applied to the field of automatic driving, intelligent driving, or short-distance communication, or may be applied to the internet of vehicles, for example, vehicle-to-everything (vehicle-to-everything, V2X), long term evolution-vehicle (long term evolution, LTE)-V, and vehicle-to-vehicle (vehicle-to-vehicle, V2V). Alternatively, the communication scenario may include local wireless communication, for example, communication between a plurality of access points (access point, AP) and a plurality of stations (station).

Figure 3:
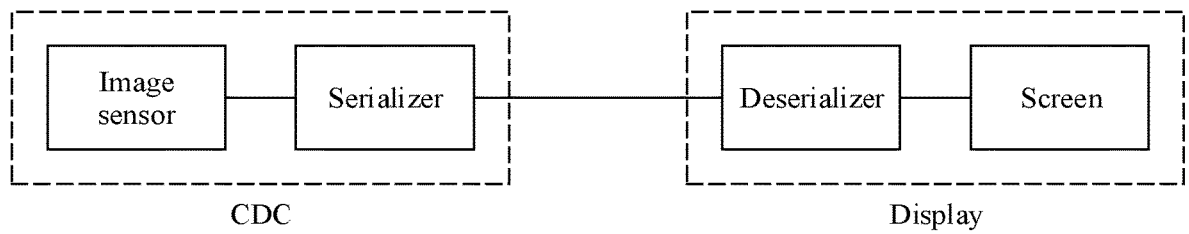
FIG. 3 is a schematic diagram of another application scenario according to an embodiment of this application.

For example, if the technical solutions provided in the embodiments of this application are applied to the intra-vehicle communication scenario, FIG. 1 and FIG. 3 show examples of two application scenarios of the embodiments of this application. FIG. 1 includes a camera and an MDC. The camera may be used as a transmit end of a data packet, and the MDC may be used as a receive end of the data packet. The camera and the MDC are connected by using a cable such as a coaxial cable or twisted pair cable. The camera includes an image sensor and a serializer (for example, a transmission chip), and an interface between the image sensor and the serializer in the camera is a mobile industry processor interface (mobile industry processor interface, MIPI) or a parallel interface. A deserializer and a processor in the MDC are connected through an interface such as an MIPI interface or a parallel interface. Image data collected by the image sensor is transmitted to the serializer through an interface such as the MIPI. The serializer receives the image data from the interface such as the MIPI, and then transmits the image data to the deserializer in the MDC through the cable. After receiving the image data, the deserializer transmits the image data to the processor through the interface such as the MIPI. The processor receives the image data, analyzes content of the image data, and may perform determining on driving.

FIG. 3 includes a CDC and a display. The CDC and the display are connected by using a cable such as a coaxial cable or a twisted pair cable. The CDC includes an image processor and a serializer (for example, a transmission chip), and an interface between the processor and the serializer is an MIPI or a parallel interface. A deserializer and a screen in the display are connected through an interface such as an MIPI interface or a parallel interface. Image data obtained by the processor in the CDC is transmitted to the serializer through an interface such as the MIPI. The serializer receives the image data from the interface such as the MIPI, and then transmits the image data to the deserializer in the display through the cable. After receiving the image data, the deserializer transmits the image data to the screen through the interface such as the MIPI, and then may display the image data on the screen.

Alternatively, if the technical solutions provided in the embodiments of this application are applied to the intra-vehicle communication scenario, the scenario shown in FIG. 1 or FIG. 3 does not constitute a limitation. The technical solutions provided in the embodiments of this application can be used, provided that two in-vehicle devices transmit an image through line transmission, and a line of the image includes a relatively large quantity of pixels. In addition, if the technical solutions provided in the embodiments of this application are applied to another wide area communication or local area communication scenario, a network architecture to which the embodiments of this application are applied may be changed accordingly.

Figure 4A:
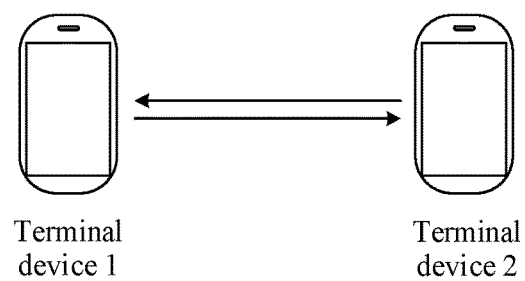
FIG. 4A to FIG. 4C are schematic diagrams of other three application scenarios according to embodiments of this application.

For example, if the technical solutions provided in the embodiments of this application are applied to the V2X communication scenario, FIG. 4A shows an application scenario of the embodiments of this application. FIG. 4A includes a terminal device 1 and a terminal device 2. The terminal device 1 and the terminal device 2 may communicate over a sidelink (sidelink, SL).

Figure 4B:
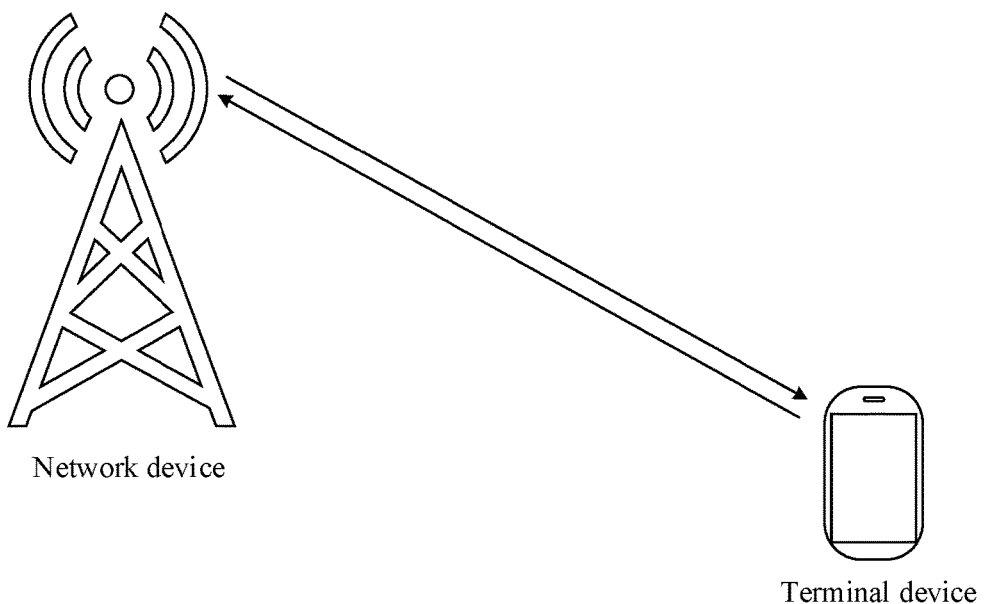

For another example, if the technical solutions provided in the embodiments of this application are applied to Uu interface-based communication in an LTE system or an NR system, FIG. 4B shows an application scenario of the embodiments of this application. FIG. 4B includes a network device and a terminal device. The network device and the terminal device may communicate through a Uu interface.

Figure 4C:
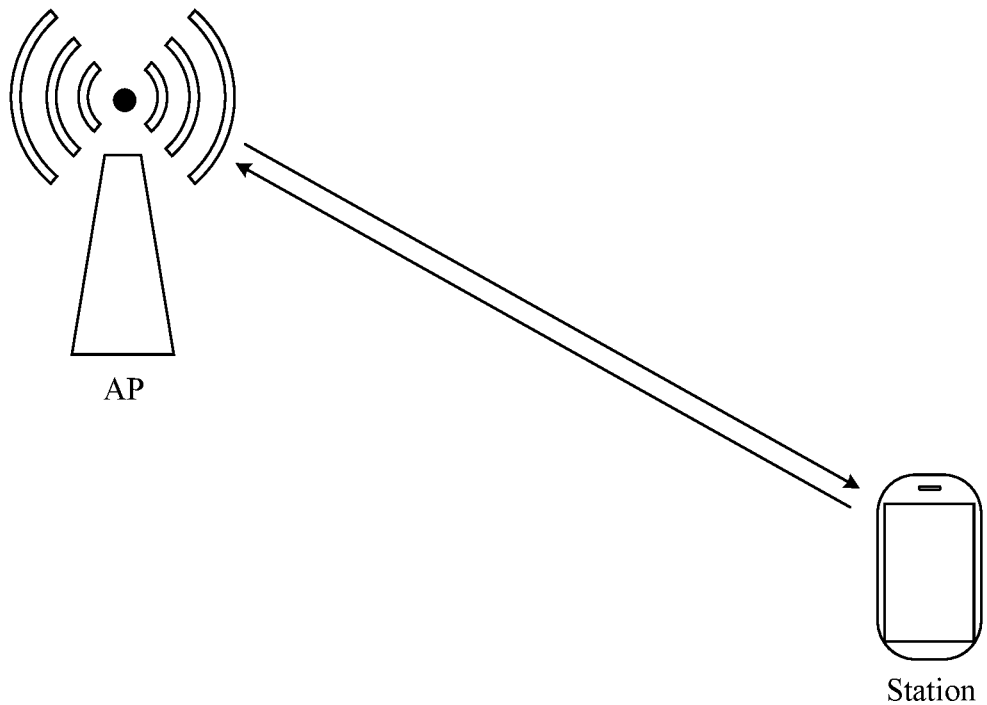

For another example, if the technical solutions provided in the embodiments of this application are applied to a wireless fidelity (wireless fidelity, Wi-Fi) scenario, FIG. 4C shows an application scenario of the embodiments of this application. FIG. 4C includes an AP and a station. The station may access the AP over Wi-Fi. In FIG. 4C, an example in which the station is a mobile phone is used.

In both FIG. 4A and FIG. 4B, an example in which the terminal device is a mobile phone is used. The terminal device in the embodiments of this application is not limited thereto.

The following describes, with reference to the accompanying drawings, the technical solutions provided in the embodiments of this application. It should be noted that a name of a field, a name of information, and the like in the following descriptions in the embodiments of this application are examples, and the field or the information in the following descriptions may have another name. The name of the field and the name of the information are not limited in the embodiments of this application.

Figure 5:
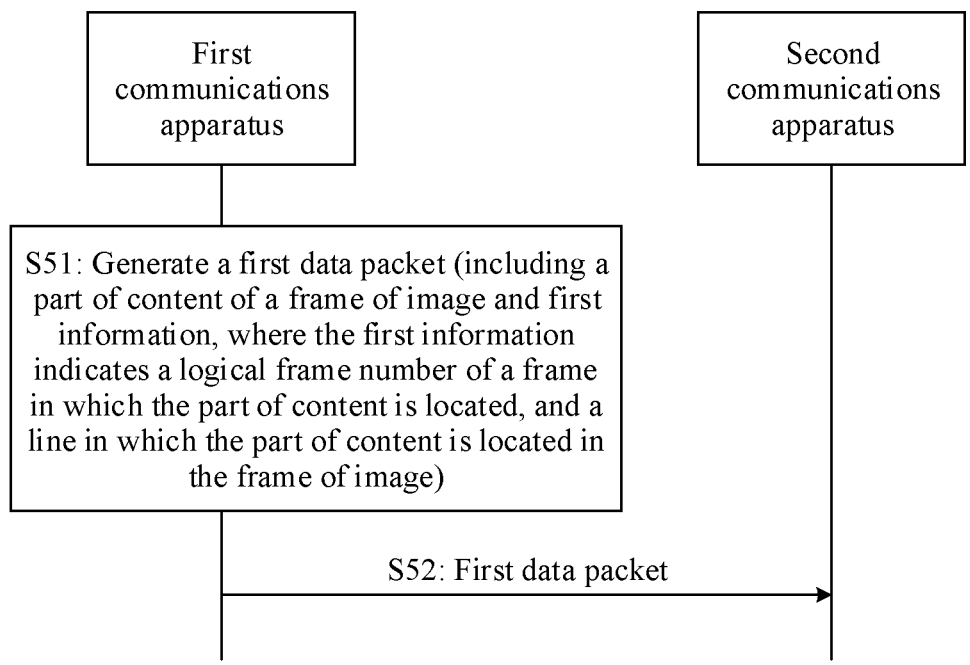
FIG. 5 is a flowchart of an image transmission method according to an embodiment of this application.

The embodiments of this application provide an image transmission method. FIG. 5 is a flowchart of the method. The method may be applied to the network architecture shown in any one of FIG. 1, FIG. 3, FIG. 4A, FIG. 4B, or FIG. 4C.

For ease of description, an example in which the method is performed by a first communications apparatus and a second communications apparatus is used below. If the embodiments of this application are applied to the network architecture shown in FIG. 1, the first communications apparatus may be the camera shown in FIG. 1, and the second communications apparatus may be the MDC shown in FIG. 1. Alternatively, if the embodiments of this application are applied to the network architecture shown in FIG. 3, the first communications apparatus may be the CDC shown in FIG. 3, and the second communications apparatus may be the display shown in FIG. 3. Alternatively, if the embodiments of this application are applied to the network architecture shown in FIG. 4A, the first communications apparatus may be the terminal device 1 shown in FIG. 4A, and the second communications apparatus may be the terminal device 2 shown in FIG. 4A; or the first communications apparatus may be the terminal device 2 shown in FIG. 4A, and the second communications apparatus may be the terminal device 1 shown in FIG. 4A. Alternatively, if the embodiments of this application are applied to the network architecture shown in FIG. 4B, the first communications apparatus may be the network device shown in FIG. 4B, and the second communications apparatus may be the terminal device shown in FIG. 4B; or the first communications apparatus may be the terminal device shown in FIG. 4B, and the second communications apparatus may be the network device shown in FIG. 4B. Alternatively, if the embodiments of this application are applied to the network architecture shown in FIG. 4C, the first communications apparatus may be the AP shown in FIG. 4C, and the second communications apparatus may be the station shown in FIG. 4C; or the first communications apparatus may be the station shown in FIG. 4C, and the second communications apparatus may be the AP shown in FIG. 4C.

S51: The first communications apparatus generates a first data packet.

The first data packet may include a payload and a header. The payload of the first data packet includes a part of content of a frame of image, for example, may include a line of pixels of the frame of image, or may include a part of a line of pixels of the frame of image (or a segment that includes a line of pixels of the frame of image). For ease of description, the content included in the payload of the first data packet is referred to as first content.

The header of the first data packet may include first information, and the first information may indicate a logical frame number of a frame in which the first content is located, and a line in which the first content is located in the frame of image. If the header of the data packet that is shown in FIG. 2 is used, a receive end may extract a frame synchronization signal by using the value of the ef field and by determining whether the value of the line_number field is equal to the value of the total_line field. In addition, the receive end may extract a line synchronization signal by using the value of the line_number field. However, in the embodiments of this application, the frame synchronization signal and the line synchronization signal can be provided by using the first information. Therefore, it may be considered that the first information may replace the ef field, the line_number field, and the total line field in the header shown in FIG. 2. If the header shown in FIG. 2 is used, the ef field can indicate only an end frame, and only an ef field in a data packet that includes the last content of a frame is set to 1, and an ef field in another data packet can only be set to 0. Alternatively, if the frame synchronization signal is extracted by using the line_number field and the total_line field, the value of the line_number field is equal to the value of the total_line field only in a data packet that includes the last content of a frame. That is, for a frame of image, the receive end can extract the frame synchronization signal only from one data packet. If the data packet is lost, the receive end cannot extract the frame synchronization signal, and therefore cannot determine a location of the end frame or a location of a start of a next frame. Consequently, image transmission disorder is caused. However, in the embodiments of this application, the first information may indicate the logical frame number of the frame in which the first content is located. Therefore, first information included in data packets that include content of a same frame needs to have a same value, and is used to indicate a logical frame number of the frame. In this way, even if some data packets are lost in a transmission process, there is still a data packet that can be normally received. A receive end can extract a frame synchronization signal based on first information included in the received data packet. It can be learned that the solutions provided in the embodiments of this application can improve frame synchronization reliability, and avoid image disorder that is caused because the receive end cannot extract the frame synchronization signal.

In addition, in the embodiments of this application, the first information indicates the logical frame number of the frame in which the first content is located. A logical frame number is a frame count mode, and does not record a real frame number, but is used to distinguish between different frames within a specific range. Because the first information indicates the logical frame number, and does not need to indicate an actual frame number, the first information does not need to include excessive bits. For example, even if the first information includes only one bit, the first information can indicate the logical frame number. However, it can be learned from the foregoing descriptions that the header shown in FIG. 2 indicates an end frame by using the of field, the line_number field, and the total_line field. It can be learned that, compared with the conventional technology, the technical solutions provided in the embodiments of this application can reduce a quantity of bits occupied by a header, reduce transmission overheads, and improve encapsulation efficiency.

Optionally, the first information indicates a line in which content included in the first content is located in the frame of image. In an implementation, the first information indicates a logical line number of the content included in the first content in the frame of image. A logical line number is a line count mode, and does not record a real line number, but is used to distinguish between different lines within a specific range. Because the first information indicates the logical line number, and does not need to indicate an actual line number, the first information does not need to include excessive bits. However, it can be learned from the foregoing descriptions that the header shown in FIG. 2 indicates a line number by using the line_number field, and the line_number field occupies one byte. Therefore, compared with the conventional technology, because the first information indicates the logical line number, and does not need to indicate an actual line number, the technical solutions provided in the embodiments of this application can reduce a quantity of bits occupied by a header, reduce transmission overheads, and improve encapsulation efficiency.

For example, a quantity of bits occupied by the first information may be greater than or equal to 1 and less than 32. Alternatively, the quantity of bits occupied by the first information is not limited, for example, may be greater than or equal to 32. However, the ef field, the line_number field, and the total_line field in the header shown in FIG. 2 occupy 33 bits in total. It can be learned that, compared with the solution shown in FIG. 2, the embodiments of this application reduce a quantity of bits occupied by a header, reduces transmission overheads, and improves encapsulation efficiency. Certainly, the quantity of bits occupied by the first information is only an example herein, and is not actually limited thereto.

That the first information indicates a logical frame number of a frame in which the first content is located, and a line in which the content included in the first content is located in the frame of image may be implemented in different manners. The following provides example descriptions.

1. Implementation 1

The first information may include frame indication information and line number indication information, and the header of the first data packet may include a frame indication field and a line number indication field. The frame indication information may be carried in the frame indication field, and the line number indication information may be carried in the line number indication field. For example, a quantity of bits occupied by the frame indication field is greater than or equal to 1 and less than 16, and a quantity of bits occupied by the line number indication field is greater than or equal to 1 and less than 16. Certainly, the quantity of bits occupied by the frame indication field and the quantity of bits occupied by the line number indication field are only examples herein, and are not actually limited thereto. For example, the quantity of bits occupied by the frame indication field may alternatively be greater than or equal to 16, and/or the quantity of bits occupied by the line number indication field may alternatively be greater than or equal to 16.

In this manner, the frame indication field (or the frame indication information) may indicate the logical frame number of the frame in which the first content is located, and the line number indication field may indicate the line in which the first content is located in the frame of image. In other words, different content may be indicated by using different information, to implement clearer indication. In addition, if the header shown in FIG. 2 is used, the ef field can indicate only an end frame, and only an ef field in a data packet that includes the last content of a frame is set to 1, and an ef field in another data packet can only be set to 0. Alternatively, if the frame synchronization signal is extracted by using the line_number field and the total_line field, the value of the line_number field is equal to the value of the total_line field only in a data packet that includes the last content of a frame. That is, for a frame of image, the receive end can extract the frame synchronization signal only from one data packet. If the data packet is lost, the receive end cannot extract the frame synchronization signal, and therefore cannot determine a location of the end frame or a location of a start of a next frame. Consequently, image transmission disorder is caused. However, in the embodiments of this application, the frame indication information may indicate the frame in which the first content is located. Therefore, frame indication information included in data packets that include content of a same frame needs to have a same value, and is used to indicate a logical frame number of the frame. In this way, even if some data packets are lost in a transmission process, there is still a data packet that can be normally received. A receive end can extract a frame synchronization signal based on frame indication information included in the received data packet. It can be learned that the solutions provided in the embodiments of this application can improve frame synchronization reliability, and avoid image disorder that is caused because the receive end cannot extract the frame synchronization signal.

In addition, if the header of the data packet that is shown in FIG. 2 is used, a receive end may extract a frame synchronization signal by using the value of the ef field and by determining whether the value of the line_number field is equal to the value of the total_line field. The ef field, the line_number field, and the total_line field occupy 33 bits in total. However, in the embodiments of this application, the quantity of bits occupied by the frame indication field is, for example, less than 16. Apparently, compared with the existing manner, the technical solutions provided in the embodiments of this application can reduce a quantity of bits occupied by a header, thereby improving encapsulation efficiency.

The frame indication information needs to indicate the logical frame number of the frame in which the first content is located. In an optional implementation, the frame indication information occupies one bit, and a value of the one bit is flipped once each frame. In this case, the frame indication information may also be referred to as frame flip indication information or a frame flip indication. Correspondingly, the frame indication field used to carry the frame indication information may also be referred to as a frame flip indication field. The frame flip indication may be understood as a logical frame number. For example, when a first frame is transmitted, a value of the frame flip indication in the data packet that includes the first frame is "1". Then, when a second frame is transmitted, the value of the frame flip indication in the data packet that includes the first frame is flipped to "0". Then, when a third frame is transmitted, the value of the frame flip indication in the data packet that includes the first frame is flipped to "1". In this way, a frame synchronization signal can be extracted by using one bit, and a quantity of bits occupied by a header can be greatly reduced.

Alternatively, the frame indication information needs to indicate the logical frame number of the frame in which the first content is located. In another optional implementation, a quantity of bits occupied by the frame indication information is greater than or equal to 2, that is, the logical frame number may be indicated by using a plurality of bits. For example, if the frame indication information occupies three bits, the frame indication information can indicate a maximum of eight frames. For a ninth frame, a value of the frame indication information is restored to an initial value, and counting is performed again. For example, when a first frame is transmitted, the value of the frame indication information in the data packet that includes the first frame is "000". Then, when a second frame is transmitted, the value of the frame indication information in the data packet that includes the second frame is "001". Then, when a third frame is transmitted, the value of the frame indication information in the data packet that includes the third frame is "010". By analogy, when an eighth frame is transmitted, the value of the frame indication information in the data packet that includes the eighth frame is "111". Then, when a ninth frame is transmitted, the value of the frame indication information in the data packet that includes the ninth frame is "000", that is, counting is performed again for the frame indication information. A logical frame number is indicated by using a relatively large quantity of bits, so that the receive end can more easily distinguish between different frames.

Alternatively, the frame indication information may occupy two bits, and counting is cyclically performed from 0 to 3. Alternatively, the frame indication information may occupy 16 bits, and counting is cyclically performed from 0 to 65535, or the like.

If the header of the data packet that is shown in FIG. 2 is used, the receive end may extract a line synchronization signal by using the value of the line_number field, and the line_number field occupies 16 bits. However, in the embodiments of this application, the receive end may extract a line synchronization signal by using the line number indication information. The quantity of bits occupied by the line number indication field is, for example, less than 16. Apparently, compared with the existing manner, the technical solutions provided in the embodiments of this application can reduce a quantity of bits occupied by a header, thereby improving encapsulation efficiency. Line number indication information included in data packets that include content of a same line of a frame of image (for example, the line of the frame of image is divided into a plurality of segments, and one packet includes one segment) has a same value. Therefore, even if packet loss occurs in a transmission process, for example, some data packets corresponding to the line are lost, the receive end can still receive the other data packets corresponding to the line. Therefore, the receive end does not lose a line synchronization signal. For the receive end, if packet loss occurs, the receive end can determine, based on the line number indication field, a line of the frame of image to which a lost data packet belongs, so as to avoid line staggering in the frame of image during transmission.

If the first information indicates the logical line number of the content included in the first content in the frame of image, the line number indication field (or the line number indication information) may be used to indicate the logical line number of the first content in the frame of image. For example, if the line number indication information occupies three bits, the line number indication information can indicate a maximum of eight lines. For a ninth line, a value of the line number indication information is restored to an initial value, and counting is performed again. For example, when a first line of the frame of image is transmitted, the value of the line number indication information in the data packet that includes the first line is "000". Then, when a second line is transmitted, the value of the line number indication information in the data packet that includes the second line is "001". Then, when a third line is transmitted, the value of the line number indication information in the data packet that includes the third line is "010". By analogy, when an eighth line is transmitted, the value of the line number indication information in the data packet that includes the eighth line is "111". Then, when a ninth line is transmitted, the value of the line number indication information in the data packet that includes the ninth line is "000", that is, counting is performed again for the line number indication information. A logical line number is indicated by using a relatively large quantity of bits, so that the receive end can more easily distinguish between different lines.

To enrich content included in the header, the header of the first data packet may further include other information in addition to the first information.

In an optional implementation, the header of the first data packet may further include one or more of the following fields: a line segment indication field, a sequence number field, a stream identifier field, a data format field, an encapsulation service type field, a reserved (reserved) field, or a payload length indication field. For example, the header of the first data packet may further include the line segment indication field. Alternatively, the header of the first data packet may further include the sequence number field. Alternatively, the header of the first data packet may further include the line segment indication field and the sequence number field. Alternatively, the header of the first data packet may further include the line segment indication field, the sequence number field, and the stream identifier field. Alternatively, the header of the first data packet may further include the line segment indication field, the sequence number field, the stream identifier field, the encapsulation service type field, the reserved field, the payload length indication field, and the data format field.

The header of the first data packet may further include a line segment indication field, that is, the header of the first data packet further includes line segment indication information. The line segment indication information is carried in the line segment indication field. The line segment indication information (or the line segment indication field) may indicate a first quantity, and the first quantity may indicate a quantity used to indicate data packets in the line in which the first content is located. For example, the first quantity is the quantity used to indicate data packets in the line in which the first content is located. In other words, if a frame of image has a relatively large quantity of pixels in a line, in the embodiments of this application, the line of pixels may also be divided into a plurality of segments, and one data packet carries one segment. If the line in which the first content is located is divided into a plurality of segments, the line segment indication field is used to indicate a quantity of the plurality of segments. For example, if the first data packet carries a segment of a second line of the frame of image, and the second line is divided into four segments, a line segment indication field in each data packet that is used to carry the second line may indicate 4. In addition, if a line of pixels is divided into a plurality of segments, data amounts (for example, quantities of included pixels) of all the segments may be the same, or data amounts of different segments may be different.

For example, in an in-vehicle scenario, a line of a frame of image is not divided into excessive segments. Therefore, the segments of the line of the frame of image may be indicated without using excessive bits. If the header of the data packet that is shown in FIG. 2 is used, the receive end may determine a segment number of a data packet by using the value of the i_seq_num field. The i_seq_num field occupies eight bits. This is definitely a waste. In the embodiments of this application, the line segment indication field indicates a quantity of segments into which a line is divided, and does not need to indicate a specific segment number. In this way, a quantity of bits occupied by the line segment indication field can be reduced, and encapsulation efficiency can be improved. In other words, the embodiments of this application provide another indication manner (that is, indicate a quantity of segments into which a line is divided), so that a quantity of bits occupied by the line segment indication field can be reduced.

Optionally, the quantity of bits occupied by the line segment indication field may be greater than or equal to 2 and less than 8. Alternatively, the quantity of bits occupied by the line segment indication field is not limited, for example, may be 1, or may be greater than or equal to 8. If the header of the data packet that is shown in FIG. 2 is used, the receive end may determine a segment number of a data packet by using the value of the i_seq_num field. The i_seq_num field occupies eight bits. However, in the embodiments of this application, the receive end may determine, by using the line segment indication field, a quantity of segments into which a line is divided, and a quantity of bits occupied by the line segment indication field is less than 8. Apparently, compared with the existing manner, the technical solutions provided in the embodiments of this application can reduce a quantity of bits occupied by a header, thereby improving encapsulation efficiency.

A line of a frame of image is divided into a plurality of segments. If a line of pixels are placed in one data packet, a transmission speed may be reduced because some control information needs to be transmitted in addition to the fact that the line of pixels are excessive. In addition to data, some control information may further need to be transmitted between the two communications apparatuses, and the control information has a delay requirement. For example, the delay requirement of the control information is a transmission time of a quarter of a data packet. In this case, a quantity of segments into which a line is divided may be determined based on the delay requirement of the control information. For example, if the delay requirement of the control information is a transmission time of a quarter of a data packet, the line may be divided into four segments, and the control information may be transmitted in a transmission gap of the four segments, so that the control information can meet the delay requirement. In other words, a quantity of segments into which a line is divided is generally relatively fixed, for example, may be determined based on the delay requirement of the control information, for example, may be two or four segments. Therefore, the quantity of segments indicated by the line segment indication field does not need to be a specific value of the line segment indication information, but a correspondence between a value of the line segment indication field and an indicated quantity may be set, and different values (or different states) of the line segment indication field may indicate different quantities. The correspondence may be specified in a protocol, or may be negotiated between the first communications apparatus and the second communications apparatus. In this correspondence, the quantity of bits occupied by the line segment indication field can be further reduced.

For example, the line segment indication field occupies two bits, and the two bits may be used as the line segment indication information. If a value of the two bits is "00", it indicates that the line in which the current data packet is located is not segmented. It may be understood that the current data packet includes a complete line of pixels. If the value of the two bits is "01", it indicates that the line in which the current data packet is located is divided into two segments, that is, the line in which the current data packet is located is carried in two data packets, and the current data packet is one of the data packets. If the value of the two bits is "10", it indicates that the line in which the current data packet is located is divided into four segments, that is, the line in which the current data packet is located is carried in four data packets, and the current data packet is one of the data packets. If the value of the two bits is "11", it may indicate "customized" or "reserved".

For another example, the line segment indication field occupies four bits, and the four bits may be used as the line segment indication information. If a value of the four bits is "0000", it indicates that the line in which the current data packet is located is divided into $2^0$ segments, that is, one segment, or it is understood that the line in which the current data packet is located is not segmented, that is, the current data packet includes a complete line of pixels. If the value of the four bits is "0001", it indicates that the line in which the current data packet is located is divided into $2^1$ segments, that is, two segments, that is, the line in which the current data packet is located is carried in two data packets, and the current data packet is one of the data packets. If the value of the four bits is "0010", it indicates that the line in which the current data packet is located is divided into $2^2$ segments, that is, four segments, that is, the line in which the current data packet is located is carried in four data packets, and the current data packet is one of the data packets. If the value of the four bits is "0011", it indicates that the line in which the current data packet is located is divided into $2^3$ segments, that is, eight segments, that is, the line in which the current data packet is located is carried in eight data packets, and the current data packet is one of the data packets. By analogy, each time the value of the four bits is incremented by "1", the corresponding power of 2 is incremented by 1. Exceptionally, if the value of the four bits is "1111, it may indicate "customized" or "reserved".

The header of the first data packet may further include a sequence number field, that is, the header of the first data packet further includes sequence number information. The sequence number information is carried in the sequence number field. The sequence number field may indicate a sequence number of the first data packet in a first data stream, and the first data stream is a data stream in which the first data packet is located. For example, a quantity of bits occupied by the sequence number field may be greater than or equal to 6 and less than or equal to 8. Alternatively, the quantity of bits occupied by the sequence number field is not limited, for example, may be less than 6, or may be greater than 8. In the embodiments of this application, data packets in each data stream may be counted, and different data streams are counted separately, to distinguish between different data streams. For example, the camera in FIG. 1 transmits three images to the MDC, and the three images are considered as three data streams. In this case, sequence number fields included in data packets in each data stream may be counted starting from an initial value. The first communications apparatus may count all data packets by using the sequence number field, so that sequence numbers of all the data packets sent by the first communications apparatus are consecutive, and the receive end can determine, based on a sequence number field in a received data packet, a data packet that is lost in a transmission process, and determine a location of the lost data packet based on the sequence number field, thereby reducing a probability that the data received by the receive end is disordered.

For example, the receive end may determine, with reference to a sequence number field, a line number indication field, and a line segment indication field in a received data packet, a location of a lost data packet in a line of a frame of image. For example, the first communications apparatus sends a data packet 1, a data packet 2, a data packet 3, a data packet 4, and a data packet 5. Line number indication fields in the data packet 1 and the data packet 2 indicate a first line, and line number indication fields in the data packet 3, the data packet 4, and the data packet 5 indicate a second line. Quantities indicated by line segment indication fields in the data packet 1 and the data packet 2 are 2, and quantities indicated by line segment indication fields in the data packet 3, the data packet 4, and the data packet 5 are 3. The second communications apparatus receives the data packet 1, the data packet 2, the data packet 4, and the data packet 5. In this case, the second communications apparatus determines, based on the line segment indication fields in the data packet 1 and the data packet 2, that all content in the first line has been received, and determines, based on the line segment indication fields in the data packet 4 and the data packet 5, that one data packet is lost in the second line. In addition, the second communications apparatus can determine, based on sequence number fields in the data packet 1, the data packet 2, the data packet 4, and the data packet 5, that a first data packet in the second line is lost. It can be learned that, in the embodiments of this application, not only encapsulation efficiency can be improved, but also the receive end can relatively clearly determine a location of a lost data packet, thereby preventing image out-of-order.

The header of the first data packet may further include a stream identifier field, that is, the header of the first data packet further includes stream identifier information. The stream identifier information is carried in the stream identifier field. The stream identifier field may indicate an identifier of the first data stream, and the first data stream is a data stream in which the first data packet is located. For example, in an in-vehicle scenario, a small quantity of data streams are transmitted. Therefore, the stream identifier field can indicate the data stream without occupying excessive bits. For example, a quantity of bits occupied by the stream identifier field may be greater than or equal to 2 and less than or equal to 5. Alternatively, the quantity of bits occupied by the stream identifier field is not limited, for example, may be 1, or may be greater than 5. For example, the camera in FIG. 1 transmits three images (for example, three high-dynamic range (high-dynamic range, HDR) images) to the MDC. The three images are considered as three data streams. In this case, a stream identifier field included in a data packet in a data stream 1 may indicate the data stream 1, a stream identifier field included in a data packet in a data stream 2 may indicate the data stream 2, and a stream identifier field included in a data packet in a data stream 3 may indicate the data stream 3, so that different data streams can be distinguished between each other.

The header of the first data packet may further include a data format field, that is, the header of the first data packet further includes data format information. The data format information is carried in the data format field. The data format field may indicate a format of the frame of image in which the first content is located and a pixel quantization depth of the frame of image. For example, the data format field may indicate that the frame of image is in RGB888, RAW10, or YUV422. For example, a quantity of bits occupied by the data format field may be greater than or equal to 6 and less than or equal to 8. Alternatively, the quantity of bits occupied by the data format field is not limited, for example, may be less than 6, or may be greater than 8.

The header of the first data packet may further include an encapsulation service type field, that is, the header of the first data packet further includes encapsulation service type information. The encapsulation service type information is carried in the encapsulation service type field. The encapsulation service type field may indicate a type of a service to which the first content belongs, for example, a video service. For example, a quantity of bits occupied by the encapsulation service type field may be greater than or equal to 4 and less than or equal to 8. Alternatively, the quantity of bits occupied by the encapsulation service type field is not limited, for example, may be less than 4, or may be greater than 8.

The header of the first data packet may further include a reserved field, and the reserved field may be used as a subsequent extension application. For example, a quantity of bits occupied by the reserved field may be greater than or equal to 6 and less than or equal to 29. Alternatively, the quantity of bits occupied by the reserved field is not limited, for example, may be less than 6, or may be greater than 29.

The header of the first data packet may further include a payload length indication field, that is, the header of the first data packet further includes payload length indication information. The payload length indication information is carried in the payload length indication field. The payload length indication information may indicate a length of the payload of the first data packet, so that the receive end can learn of the length of the payload of the first data packet based on the header, to obtain the payload of the first data packet. For example, a quantity of bits occupied by the payload length indication field may be greater than or equal to 16. Alternatively, the quantity of bits occupied by the payload length indication field is not limited, for example, may be less than 16.

In addition, the first data packet further includes a payload and a trailer, and the trailer is, for example, a check bit, used to check the first data packet. For example, the trailer is a cyclic redundancy check (cyclic redundancy check, CRC) bit.

For example, the header of the first data packet includes the frame indication field, the line number indication field, the line segment indication field, the sequence number field, the stream identifier field, the data format field, the encapsulation service type field, the reserved field, and the payload length indication field. For a format of the first data packet, refer to Table 1.

TABLE 1

| Area | Field type | Field length (bit) |
| --- | --- | --- |
| Header | Encapsulation service type | 4 |
| | Data format | 6 |
| | Frame flip indication | 1 |
| | Line number indication | 3 |
| | Line segment indication | 4 |
| | Stream ID | 2 |
| | Sequence number | 6 |
| | Reserved | 6 |
| | Payload length indication | 16 |
| Payload | Payload | Maximum: 65536 × 8 |
| Trailer | CRC bit | 16 |

In Table 1, an example in which the frame indication field is a frame flip indication field is used. In addition, the stream ID (ID) field is a stream identifier field.

2. Implementation 2

The first information is used to indicate, by using a joint coding scheme, the logical frame number of the frame in which the first content is located, and the line in which the first content is located in the frame of image. In this manner, the first information does not need to be divided into frame indication information and line number indication information as in the implementation 1, but is used as complete information. The logical frame number of the frame in which the first content is located and the line in which the first content is located in the frame of image can be indicated by using the information. For example, in this manner, the first data packet includes an image synchronization indication field, and the image synchronization indication field may carry the first information.

For example, the first information occupies six bits. If a value of the six bits is "000000", it indicates a start frame and a logical line number of a first line in the frame. If the value of the six bits is "111111", it indicates an end frame and a logical line number of a last line in the frame. If the value of the six bits is "000001" to "111110", it indicates a corresponding line number in a frame. For example, if the value is "000001", it indicates a logical line number of a second line in the frame. If the value is "000011", it indicates a logical line number of a third line in the frame. The joint coding scheme is used, so that one piece of information (that is, the first information) can indicate more content, thereby improving information utilization. In addition, using the joint coding scheme helps reduce a quantity of bits occupied by a field for completing a same function, and can improve encapsulation efficiency to a greater extent. In addition, states of the first information clearly indicate a start and an end of a frame respectively. Even if a data packet used to indicate an end frame of a previous frame is lost, the receive end can determine a start location of a next frame based on a received data packet used to indicate the start frame of the next frame, and can determine the end location of the previous frame accordingly. Apparently, compared with the solution in which a frame trailer can be determined by using only one data packet in the header shown in FIG. 2, the technical solutions in the embodiments of this application can help the receive end determine the start and the end of the frame more reliably.

To enrich content included in the header, the header of the first data packet may further include other information in addition to the first information. In an optional implementation, the header of the first data packet may further include one or more of the following fields: a line segment indication field, a sequence number field, a stream identifier field, a data format field, an encapsulation service type field, a reserved field, or a payload length indication field. For this part of content, refer to the descriptions in the implementation 1.

In addition, the first data packet further includes a payload and a trailer, and the trailer is, for example, a check bit, used to check the first data packet. For example, the trailer is a CRC bit.

For example, the header of the first data packet includes the image synchronization indication field, the line segment indication field, the sequence number field, the stream identifier field, the data format field, the encapsulation service type field, the reserved field, and the payload length indication field. For a format of the first data packet, refer to Table 2.

TABLE 2

| Area | Field type | Field length (bit) |
|---|---|---|
| Header | Encapsulation service type | 4 |
|  | Data format | 6 |
|  | Image synchronization indication | 6 |
|  | Line segment indication | 4 |
|  | Stream ID | 2 |
|  | Sequence number | 6 |
|  | Reserved | 4 |
|  | Payload length indication | 16 |
| Payload | Payload | Maximum: 65536 × 8 |
| Trailer | CRC bit | 16 |

In Table 2, the stream ID field is a stream identifier field.

3. Implementation 3

In this implementation, in addition to the logical frame number of the frame in which the first content is located and the line in which the first content is located in the frame of image, the first information may further indicate a first quantity, and the first quantity is used to indicate a quantity of data packets in the line in which the first content is located. For example, the first information may indicate, by using a joint coding scheme, the logical frame number of the frame in which the first content is located, the line in which the first content is located in the frame of image, and the first quantity. In this manner, the first information does not need to be divided into frame indication information, line number indication information, and line segment indication information as in the implementation 1 or there is no need to divide information into the first information and the line segment indication information as in the implementation 2, but is used as complete information. The logical frame number of the frame in which the first content is located, the line in which the first content is located in the frame of image, and the first quantity can be indicated by using the information. For example, in this manner, the first data packet includes an image synchronization assistance indication field, and the image synchronization assistance indication field may carry the first information.

For example, the first information occupies eight bits. If a value of the eight bits is "00000000", it indicates that the first content is a first segment in a first line of a first frame. If the value of the eight bits is "00000001", it indicates that the first content is a second segment in the first line of the first frame. If the value of the eight bits is "00000011", it indicates that the first content is a third segment in the first line of the first frame. If the value of the eight bits is "00010000", it indicates that the first content is a first segment in a second line of the first frame. If the value of the eight bits is "00010001", it indicates that the first content is a second segment in the second line of the first frame. If the value of the eight bits is "10110000", it indicates that the first content is a first segment in a third line of a second frame. If the value of the eight bits is "01110000", it indicates that the first content is a first segment in a seventh line of a third frame, and so on. The frame numbers indicated herein are all logical frame numbers, and the line numbers indicated herein are also logical line numbers.

The joint coding scheme is used, so that one piece of information (that is, the first information) can indicate more content, thereby improving information utilization. In addition, in a third implementation, the first information can indicate more content, so that a quantity of bits occupied by a field for completing a same function can be reduced to a greater extent, thereby improving encapsulation efficiency to a greater extent. In addition, states of the first information clearly indicate a start and an end of a frame respectively. Even if a data packet used to indicate an end frame of a previous frame is lost, the receive end can determine a start location of a next frame based on a received data packet used to indicate the start frame of the next frame, and can determine the end location of the previous frame accordingly. Apparently, compared with the solution in which a frame trailer can be determined by using only one data packet in the header shown in FIG. 2, the technical solutions in the embodiments of this application can help the receive end determine the start and the end of the frame more reliably.

To enrich content included in the header, the header of the first data packet may further include other information in addition to the first information. In an optional implementation, the header of the first data packet may further include one or more of the following fields: a sequence number field, a stream identifier field, a data format field, an encapsulation service type field, a reserved field, or a payload length indication field. For this part of content, refer to the descriptions in the implementation 1.

In addition, the first data packet further includes a payload and a trailer, and the trailer is, for example, a check bit, used to check the first data packet. For example, the trailer is a CRC bit.

For example, the header of the first data packet includes the image synchronization assistance indication field, the sequence number field, the stream identifier field, the data format field, the encapsulation service type field, the reserved field, and the payload length indication field. For a format of the first data packet, refer to Table 3.

TABLE 3

| Area | Field type | Field length (bit) |
| --- | --- | --- |
| Header | Encapsulation service type | 4 |
| | Data format | 6 |
| | Image synchronization assistance indication | 8 |
| | Stream ID | 2 |
| | Sequence number | 6 |
| | Reserved | 6 |
| | Payload length indication | 16 |
| Payload | Payload | Maximum: 65536 × 8 |
| Trailer | CRC bit | 16 |

In Table 3, the stream ID field is a stream identifier field.

A specific manner of the foregoing three manners that is used to implement the first information may be specified in a protocol, or may be negotiated between the first communications apparatus and the second communications apparatus, or may be preconfigured in the first communications apparatus and the second communications apparatus.

S52: The first communications apparatus sends the first data packet to the second communications apparatus, and correspondingly, the second communications apparatus receives the first data packet from the first communications apparatus.

After generating the first data packet, the first communications apparatus may send the first data packet to the second communications apparatus, so that the second communications apparatus can receive the first data packet. If the second communications apparatus knows an encapsulation format of the first data packet, for example, the format shown in Table 1, Table 2, or Table 3, the second communications apparatus can decapsulate the first data packet according to the corresponding encapsulation format, to obtain the payload of the first data packet or obtain the first content.

In the embodiments of this application, the first information may indicate the logical frame number of the frame in which the first content is located. Because the first information indicates the logical frame number, and does not need to indicate an actual frame number, the first information does not need to include excessive bits. For example, even if the first information includes only one bit, the first information can indicate the logical frame number. However, it can be learned from the foregoing descriptions that the header shown in FIG. 2 indicates an end frame by using the of field, the line_number field, and the total_line field. It can be learned that, compared with the conventional technology, the technical solutions provided in the embodiments of this application can reduce a quantity of bits occupied by a header, reduce transmission overheads, and improve encapsulation efficiency. In addition, the first information may also indicate the logical line number of the first content in the frame. Because the first information indicates the logical line number, and does not need to indicate an actual line number, the first information does not need to include excessive bits. This can reduce a quantity of bits occupied by a header, reduce transmission overheads, and improve encapsulation efficiency.

The method provided in the embodiments of this application is described above in detail. The following describes in detail a communications apparatus provided in the embodiments of this application. It should be understood that descriptions of embodiments of the communications apparatus correspond to the descriptions of the method embodiments. Therefore, for content that is not described in detail, refer to the foregoing method embodiments. For brevity, details are not described herein again.

In the embodiments of this application, function modules of the communications apparatus may be obtained through division. For example, the function modules may be obtained through division corresponding to functions, or two or more functions may be integrated into one function module. The integrated module may be implemented in a form of hardware, or may be implemented in a form of a software function module. It should be noted that module division in the embodiments of this application is an example, and is merely a logical function division. During actual implementation, another division manner may be used.

Figure 6:
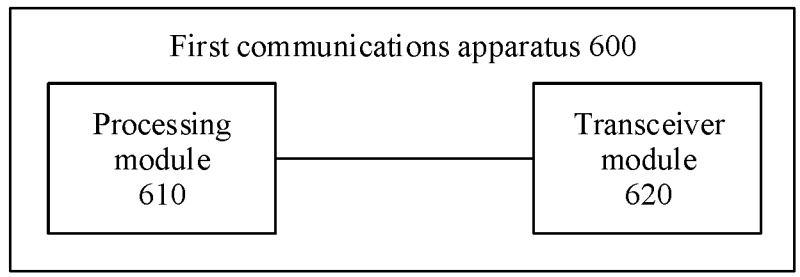
FIG. 6 is a schematic diagram of a structure of a first communications apparatus according to an embodiment of this application.

For example, when function modules of a first communications apparatus are obtained through division in an integrated manner, FIG. 6 is a possible schematic diagram of a structure of a first communications apparatus 600 used in the foregoing embodiments of this application. The first communications apparatus 600 may include a transceiver module 620 and a processing module 610. The processing module 610 may be configured to perform all operations other than the sending operation and the receiving operation performed by the first communications apparatus in the foregoing method embodiments, and/or another process used to support the technology described in this specification. The transceiver module 620 may be configured to perform the receiving operation and/or the sending operation performed by the first communications apparatus in the foregoing method embodiments, and/or another process used to support the technology described in this specification. The transceiver module may alternatively be replaced by a transmission module, or the transceiver module may include an independent sending module and an independent receiving module, and may include another process used to support the technology described in this specification.

The processing module 610 is configured to generate a first data packet, where the first data packet includes a part of content of a frame of image and first information, and the first information is used to indicate a logical frame number of a frame in which the part of content is located, and a line in which the part of content is located in the frame of image.

The transceiver module 620 is configured to send the first data packet to a second communications apparatus.

In an optional implementation, the first information includes frame indication information and line number indication information, the frame indication information is carried in a frame indication field, and the line number indication information is carried in a line number indication field. That the first information is used to indicate a logical frame number of a frame in which the part of content is located, and a line in which the part of content is located in the frame of image includes:

The frame indication field is used to indicate the logical frame number of the frame in which the part of content is located, and the line number indication field is used to indicate the line in which the part of content is located in the frame of image.

In an optional implementation, that the first information is used to indicate a logical frame number of a frame in which the part of content is located, and a line in which the part of content is located in the frame of image includes:

The first information is used to indicate, by using a joint coding scheme, the logical frame number of the frame in which the part of content is located, and the line in which the part of content is located in the frame of image.

In an optional implementation, the first data packet further includes a line segment indication field, the line segment indication field is used to indicate a first quantity, and the first quantity is used to indicate a quantity of data packets in the line in which the part of content is located.

In an optional implementation, a quantity of bits occupied by the line segment indication field is greater than or equal to 2 and less than 8.

In an optional implementation, the first information is further used to indicate a first quantity, and the first quantity is used to indicate a quantity of data packets in the line in which the part of content is located. That the first information is used to indicate a logical frame number of a frame in which the part of content is located, a line in which the part of content is located in the frame of image, and the first quantity includes:

The first information is used to indicate, by using a joint coding scheme, the logical frame number of the frame in which the part of content is located, the line in which the part of content is located in the frame of image, and the first quantity.

In an optional implementation, that the first information is used to indicate a line in which the part of content is located in the frame of image includes:

The first information is used to indicate a logical line number of the part of content in the frame of image.

In an optional implementation, the first data packet further includes a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

In an optional implementation, the first data packet further includes a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

In an optional implementation, the first data packet further includes a data format field, and the data format field is used to indicate a format and a pixel quantization depth of the frame of image.

For functions that can be completed by the transceiver module 620 and the processing module 610, refer to the descriptions in the foregoing method embodiments.

Figure 7:
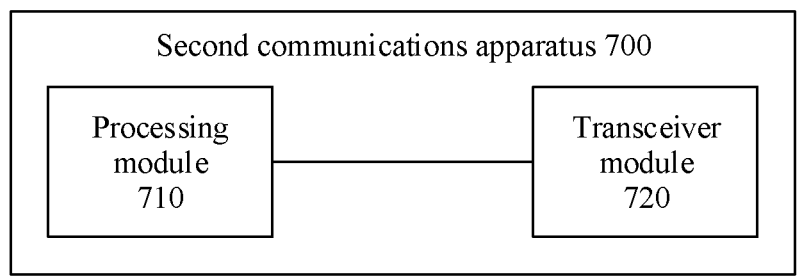
FIG. 7 is a schematic diagram of a structure of a second communications apparatus according to an embodiment of this application.

FIG. 7 is a possible schematic diagram of a structure of a second communications apparatus 700 used in the foregoing embodiments of this application. The second communications apparatus 700 may include a transceiver module 720 and a processing module 710. The processing module 710 may be configured to perform all operations other than the sending operation and the receiving operation performed by the second communications apparatus in the foregoing method embodiments, and/or another process used to support the technology described in this specification. The transceiver module 720 may be configured to perform the receiving operation and/or the sending operation performed by the second communications apparatus in the foregoing method embodiments, and/or another process used to support the technology described in this specification. The transceiver module may alternatively be replaced by a transmission module, or the transceiver module may include an independent sending module and an independent receiving module, and may include another process used to support the technology described in this specification.

The transceiver module 720 is configured to receive a first data packet from a first communications apparatus.

The processing module 710 is configured to: obtain a part of content of a frame of image and first information from the first data packet, and determine, based on the first information, a logical frame number of a frame in which the part of content is located, and a line in which the part of content is located in the frame of image.

In an optional implementation, the first information includes frame indication information and line number indication information, the frame indication information is carried in a frame indication field, and the line number indication information is carried in a line number indication field. The processing module 710 is configured to:

determine, based on the frame indication field, the logical frame number of the frame in which the part of content is located, and determine, based on the line number indication field, the line in which the part of content is located in the frame of image.

In an optional implementation, the processing module 710 is configured to:

determine, based on a joint coding scheme in the first information, the logical frame number of the frame in which the part of content is located, and the line in which the part of content is located in the frame of image.

In an optional implementation, the first data packet further includes a line segment indication field, the line segment indication field is used to indicate a first quantity, and the first quantity is used to indicate a quantity of data packets in the line in which the part of content is located.

In an optional implementation, a quantity of bits occupied by the line segment indication field is greater than or equal to 2 and less than 8.

In an optional implementation, the first information is further used to indicate a first quantity, and the first quantity is used to indicate a quantity of data packets in the line in which the part of content is located. The processing module 710 is configured to:

determine, based on a joint coding scheme in the first information, the logical frame number of the frame in which the part of content is located, the line in which the part of content is located in the frame of image, and the first quantity.

In an optional implementation, the processing module 710 is configured to:

determine, based on the first information, a logical line number of the part of content in the frame of image.

In an optional implementation, the first data packet further includes a sequence number field, the sequence number field is used to indicate a sequence number of the first data packet in a first data stream, and the first data stream is a data stream in which the first data packet is located.

In an optional implementation, a quantity of bits occupied by the sequence number field is greater than or equal to 6 and less than or equal to 8.

In an optional implementation, the first data packet further includes a stream identifier field, and the stream identifier field is used to indicate an identifier of the data stream in which the first data packet is located.

In an optional implementation, a quantity of bits occupied by the stream identifier field is greater than or equal to 2 and less than or equal to 5.

In an optional implementation, the first data packet further includes a data format field, and the data format field is used to indicate a format and a pixel quantization depth of the frame of image.

For functions that can be completed by the transceiver module 720 and the processing module 710, refer to the descriptions in the foregoing method embodiments.

Figure 8:
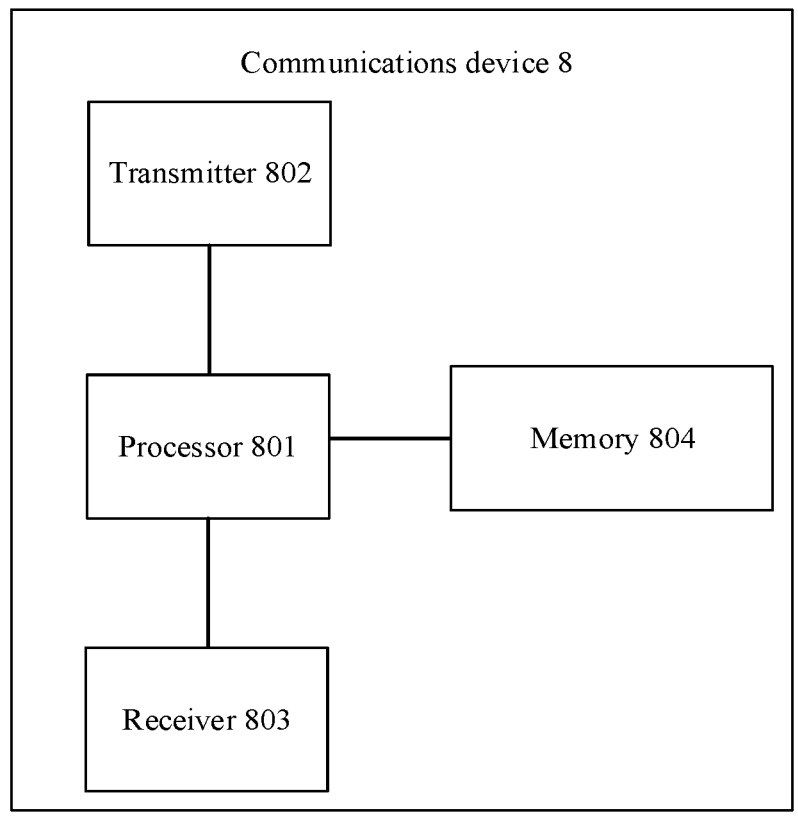
FIG. 8 is a schematic diagram of a structure of a communications device according to an embodiment of this application.

FIG. 8 is another possible schematic diagram of a structure of a first communications apparatus or a second communications apparatus according to an embodiment of this application. The communications device 8 may include at least one processor 801, a transmitter 802, and a receiver 803. A function of the processor 801 may correspond to the function of the processing module 610 or the processing module 710, and functions of the transmitter 802 and the receiver 803 may correspond to the function of the transceiver module 620 or the transceiver module 720. Details are not described herein again. Optionally, the communications device 8 may further include a memory 804, configured to store program instructions and/or data, for the at least one processor 801 to read.

Figure 9:
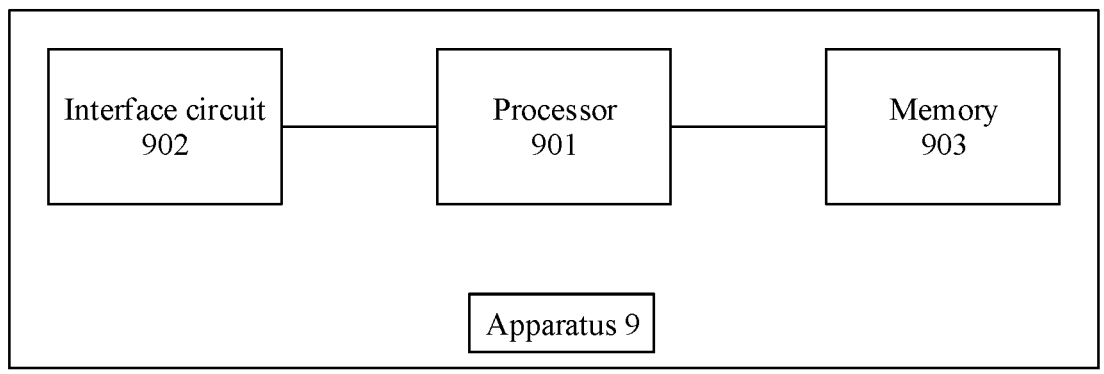
FIG. 9 is a schematic diagram of a structure of an apparatus according to an embodiment of this application.

FIG. 9 is a schematic diagram of a structure of an apparatus 9 according to an embodiment of this application. The apparatus 9 shown in FIG. 9 may be a first communications apparatus or a second communications apparatus, or may be a chip or a circuit that can complete a function of the first communications apparatus or the second communications apparatus. For example, the chip or the circuit may be disposed in the first communications apparatus or the second communications apparatus. The apparatus 9 shown in FIG. 9 may include at least one processor 901 and an interface circuit 902. The processor 901 implements the steps in the method provided in the foregoing embodiments. Optionally, the apparatus 9 may further include a memory 903, and the memory 903 may be configured to store instructions. The processor 901 executes the instructions stored in the memory 903, so that the apparatus 9 implements the steps in the method provided in the foregoing method embodiments.

Further, the processor 901, the interface circuit 902, and the memory 903 may communicate with each other over an internal connection path to transfer a control signal and/or a data signal. The memory 903 is configured to store a computer program. The processor 901 may invoke and run the computer program from the memory 903, to control the interface circuit 902 to receive a signal or send a signal. Alternatively, the processor 901 invokes and runs the computer program from the memory 903 through the interface circuit 902, to complete the steps performed by the first communications apparatus or the second communications apparatus in the method provided in the foregoing embodiments. The memory 903 may be integrated into the processor 901, or may be disposed separately from the processor 901.

Optionally, if the apparatus 9 is a device, the interface circuit 902 may include a receiver and a transmitter. The receiver and the transmitter may be a same component or different components. When the receiver and the transmitter are a same component, the component may be referred to as a transceiver.

Optionally, if the apparatus 9 is a chip or a circuit, the interface circuit 902 may include an input interface and an output interface, and the input interface and the output interface may be a same interface or different interfaces.

Optionally, if the apparatus 9 is a chip or a circuit, the apparatus 9 may not include the memory 903. The processor 901 may read instructions (a program or code) in a memory outside the chip or the circuit, to implement the steps performed by the first communications apparatus or the second communications apparatus in the method provided in the foregoing embodiments.

Optionally, if the apparatus 9 is a chip or a circuit, the apparatus 9 may include a resistor, a capacitor, or another corresponding function component, and the processor 901 or the interface circuit 902 may be implemented by a corresponding function component.

In an implementation, it may be considered that a function of the interface circuit 902 is implemented by a transceiver circuit or a transceiver-dedicated chip. It may be considered that the processor 901 is implemented by a dedicated processing chip, a processing circuit, a processor, or a general-purpose chip.

In another implementation, it may be considered that the first communications apparatus or the second communications apparatus provided in the embodiments of this application is implemented by a general-purpose computer. That is, program code for implementing functions of the processor 901 and the interface circuit 902 is stored in the memory 903, and the processor 901 implements the functions of the processor 901 and the interface circuit 902 by executing the program code stored in the memory 903.

The functions and actions of the foregoing listed modules or units in the apparatus 9 are merely examples for description, and the function units in the apparatus 9 may be configured to perform the actions or processing processes performed by the first communications apparatus or the second communications apparatus in the foregoing method embodiments. To avoid repetition, details are not described herein.

An embodiment of this application further provides a communications system, which may be applied to unmanned driving or intelligent driving. The communications system includes at least one first communications apparatus or second communications apparatus mentioned in the foregoing embodiments of this application. The at least one communications apparatus in the communications system may be integrated into an entire system or a device. Alternatively, the at least one communications apparatus in the communications system may be independently disposed as an element or apparatus.

In an optional manner, when the first communications apparatus or the second communications apparatus is implemented by using software, the first communications apparatus or the second communications apparatus may be completely or partially implemented in a form of a computer program product. The computer program product includes one or more computer instructions. When the computer program instructions are loaded and executed on a computer, all or some of the procedures or functions in the embodiments of this application are implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It should be noted that the first communications apparatus or the second communications apparatus configured to perform the image transmission method provided in the embodiments of this application may include one or more processors. The one or more processors may be central processing units (central processing unit, CPU), general-purpose processors, digital signal processors (digital signal processor, DSP), application-specific integrated circuits (application-specific integrated circuit, ASIC), field programmable gate arrays (field programmable gate array, FPGA) or other programmable logic devices, transistor logic devices, hardware components, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. Alternatively, if the first communications apparatus or the second communications apparatus is a processing apparatus, the processing apparatus may be a CPU, a general-purpose processor, a DSP, an ASIC, an FPGA or another programmable logic device, a transistor logic device, a hardware component, or any combination thereof. The processing apparatus may implement or execute various example logical blocks, modules, and circuits described with reference to content disclosed in this application. Alternatively, the processing apparatus may be a combination of processing apparatuses implementing a computing function, for example, a combination of one or more microprocessors, or a combination of a DSP and a microprocessor.

Method or algorithm steps described in combination with the embodiments of this application may be implemented by using hardware, or may be implemented by a processor by executing software instructions. The software instruction may include a corresponding software module, and the software module may be stored in a random access memory (random access memory, RAM), a flash memory, a read-only memory (read-only memory, ROM), an erasable programmable read-only memory (erasable programmable read-only memory, EPROM), an electrically erasable programmable read-only memory (electrically erasable programmable read-only memory, EEPROM), a register, a hard disk, a removable hard disk, a compact disc read-only memory (compact disc read-only memory, CD-ROM), or any other form of storage medium well known in the art. An example storage medium is coupled to a processor, so that the processor can read information from the storage medium or write information into the storage medium. Certainly, the storage medium may be a component of the processor. The processor and the storage medium may be located in an ASIC. In addition, the ASIC may be located in the first apparatus. Certainly, the processor and the storage medium may alternatively exist in the first communications apparatus, the second communications apparatus, a third communications apparatus, or a fourth communications apparatus as discrete components.

It may be understood that FIG. 6 to FIG. 9 merely show a simplified design of the first communications apparatus or the second communications apparatus. In actual application, the first communications apparatus or the second communications apparatus may include any quantity of transmitters, receivers, processors, controllers, memories, or other possible elements.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely an example. For example, the division into the modules or units is merely logical function division, and there may be another division manner during actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of the embodiments of this application, but are not intended to limit the protection scope of the embodiments of this application. Any variation or replacement within the technical scope disclosed in this application shall fall within the protection scope of the embodiments of this application. Therefore, the protection scope of the embodiments of this application shall be subject to the protection scope of the claims.

What is claimed is:

1. An image transmission method, comprising:
generating, by a first communications apparatus, a first data packet, wherein the first data packet comprises a portion of an image frame, frame indication information indicating a logical frame number of the portion of the image frame, and line number indication information indicating a logical line number of the portion of the image frame, wherein the frame indication information is carried in a frame indication field and the line number indication information is carried in a line number indication field and wherein the line number indication field occupies three bits; and
sending, by the first communications apparatus, the first data packet to a second communications apparatus.

2. The method according to claim 1, wherein the frame indication field is a frame flip indication field that occupies one bit, and a value of the one bit is flipped once each frame.

3. The method according to claim 1, wherein the line number indication information has a same value with another line number indication information included in another data packet, and wherein a portion of the another data packet is located in a same line in which the portion of the image frame is located.

4. The method according to claim 1, wherein the first data packet comprises a payload that comprises the portion of the image frame and a header that comprises the frame indication information and the line number indication information.

5. The method according to claim 4, wherein the header of the first data packet further comprises a line segment indication field indicating a first quantity of data packets in a line in which the portion is located.

6. The method according to claim 5, wherein a quantity of bits occupied by the line segment indication field is greater than or equal to 2 and less than 8.

7. The method according to claim 4, wherein the header of the first data packet further comprises a sequence number field indicating a sequence number of the first data packet in a first data stream in which the first data packet is located.

8. The method according to claim 7, wherein a quantity of bits occupied by the sequence number field is less than 6.

9. The method according to claim 4, wherein the header of the first data packet further comprises a stream identifier field indicating an identifier of a data stream in which the first data packet is located.

10. The method according to claim 9, wherein the stream identifier field occupies five bits.

11. The method according to claim 4, wherein the header of the first data packet further comprises a data format field indicating a format and a pixel quantization depth of the image frame.

12. A communications apparatus, comprising at least one processor coupled to a memory, wherein the memory stores instructions for execution by the at least one processor to cause the communications apparatus to:
generate a first data packet, wherein the first data packet comprises a portion of an image frame, frame indication information indicating a logical frame number of the portion of the image frame, and line number indication information indicating a logical line number of the portion of the image frame, wherein the frame indication information is carried in a frame indication field and the line number indication information is carried in a line number indication field and wherein the line number indication field occupies three bits; and
send the first data packet to a second communications apparatus.

13. The communications apparatus according to claim 12, wherein the frame indication field is a frame flip indication field that occupies one bit, and a value of the one bit is flipped once each frame.

14. The communications apparatus according to claim 12, wherein the line number indication information has a same value with another line number indication information included in another data packet, and wherein a portion of the another data packet is located in a same line in which the portion of the image frame is located.

15. The communications apparatus according to claim 12, wherein the first data packet comprises a payload that comprises the portion of the image frame and a header that comprises the frame indication information and the line number indication information.

16. The communications apparatus according to claim 15, wherein the header of the first data packet further comprises a line segment indication field indicating a first quantity of data packets in a line in which the portion is located.

17. The communications apparatus according to claim 16, wherein a quantity of bits occupied by the line segment indication field is greater than or equal to 2 and less than 8.

18. The communications apparatus according to claim 15, wherein the header of the first data packet further comprises a sequence number field indicating a sequence number of the first data packet in a first data stream in which the first data packet is located.

19. The communications apparatus according to claim 18, wherein a quantity of bits occupied by the sequence number field is less than 6.

20. The communications apparatus according to claim 15, wherein the header of the first data packet further comprises a stream identifier field indicating an identifier of a data stream in which the first data packet is located.

21. The communications apparatus according to claim 20, wherein the stream identifier field occupies five bits.

22. The communications apparatus according to claim 15, wherein the header of the first data packet further comprises a data format field indicating a format and a pixel quantization depth of the image frame.

23. A communications system comprising a first communication apparatus and a second communication apparatus, wherein:
the first communications apparatus comprises at least one processor coupled to a memory, wherein the memory stores instructions for execution by the at least one processor to cause the first communications apparatus to:
generate a first data packet, wherein the first data packet comprises a portion of an image frame, frame indication information indicating a logical frame number of the portion of the image frame, and line number indication information indicating a logical line number of the portion of the image frame, wherein the frame indication information is carried in a frame indication field and the line number indication information is carried in a line number indication field and wherein the line number indication field occupies three bits; and
send the first data packet to a second communications apparatus; and the second communications apparatus comprises at least one processor coupled to a memory, wherein the memory stores instructions for execution by the at least one processor to cause the second communications apparatus to:
receive the first data packet from the first communications apparatus;
obtain the portion of the image frame, the frame indication information, and the line number indication information from the first data packet]; and
determine, based on the frame indication information and the line number indication information, the logical frame number of the image frame and the logical line number of the portion.

* * * * *